(12) United States Patent
Sugiki et al.

(10) Patent No.: US 8,009,501 B2
(45) Date of Patent: Aug. 30, 2011

(54) STORAGE APPARATUS AND POWER SAVING METHOD THEREOF

(75) Inventors: Masao Sugiki, Yokohama (JP); Chiaki Shoujima, Ooi (JP)

(73) Assignee: Hitachi, Ltd., Tokyo (JP)

( * ) Notice: Subject to any disclaimer, the term of this patent is extended or adjusted under 35 U.S.C. 154(b) by 859 days.

(21) Appl. No.: 12/007,850

(22) Filed: Jan. 16, 2008

(65) Prior Publication Data

US 2009/0083558 A1     Mar. 26, 2009

(30) Foreign Application Priority Data

Sep. 26, 2007    (JP) ................................ 2007-248521

(51) Int. Cl.
*G11C 5/14* (2006.01)
(52) U.S. Cl. .......... 365/227; 713/320; 706/21; 711/114; 711/E12.001
(58) Field of Classification Search ................... 365/227; 713/320; 706/21; 711/114, E12.001
See application file for complete search history.

(56) References Cited

U.S. PATENT DOCUMENTS

| | | | |
|---|---|---|---|
| 2004/0193787 A1* | 9/2004 | Takizawa | 711/105 |
| 2005/0149668 A1 | 7/2005 | Suzuki et al. | |
| 2006/0075282 A1* | 4/2006 | Borkenhagen et al. | 714/5 |
| 2006/0193073 A1 | 8/2006 | Hakamata et al. | |
| 2008/0104431 A1* | 5/2008 | Shimada | 713/300 |

FOREIGN PATENT DOCUMENTS

| | | |
|---|---|---|
| JP | 2000-100053 | 9/1998 |
| JP | 2000-293314 | 4/1999 |
| JP | 2004-348876 | 5/2003 |

\* cited by examiner

*Primary Examiner* — Hoai V Ho
*Assistant Examiner* — Fernando N Hidalgo
(74) *Attorney, Agent, or Firm* — Volpe and Koenig, P.C.

(57) ABSTRACT

This storage apparatus includes an access history storage unit for storing, when there is a write request for writing data into the data storage unit or a read request for reading data stored in the data storage unit, history of the write request or read request as access history, an operational information storage unit for storing operational information showing whether the data storage unit is operating, an access prediction unit for predicting whether the data storage unit will be accessed based on the access history, and an operational control unit for performing operational control of pre-starting the data storage unit when the data storage unit is shut off and the access prediction unit predicts that the data storage unit will be accessed, or stopping the data storage unit when the data storage unit is operating and the access prediction unit predicts that the data storage unit will not be accessed.

10 Claims, 19 Drawing Sheets

| STORAGE APPARATUS | RAID GROUP | RAID LEVEL | STATUS (CURRENT) | SPIN DOWN START DATE AND TIME | SPIN DOWN STATUS | SPIN UP START DATE AND TIME |
|---|---|---|---|---|---|---|
| STORAGE 01 | 001 | R5 | NORMAL (SPIN UP) | 2007/06/08 07:00 | POWER SAVING (PARTIAL SPIN DOWN) | |
| | 002 | R6 | POWER SAVING (PARTIAL SPIN DOWN) | 2007/06/07 23:00 | POWER SAVING (HALF SPIN DOWN) | 2007/06/08 07:00 |
| | 003 | R1 | NORMAL (SPIN UP) | 2007/06/08 06:00 | POWER SAVING (HALF SPIN DOWN) | |
| | 004 | R1 | NORMAL (SPIN UP) | 2007/06/07 17:00 | POWER SAVING (COMPLETE SPIN DOWN) | |
| | 005 | R5 | NORMAL (SPIN UP) | | | 2007/06/07 23:00 |
| | 006 | R1 | POWER SAVING (SPIN DOWN IN PROCESSING) | | POWER SAVING (HALF SPIN DOWN) | |
| | 007 | R6 | POWER SAVING (COMPLETE SPIN DOWN) | | | |
| | 008 | R1 | POWER SAVING (HALF SPIN DOWN) | | | 2007/06/07 17:00 |
| | 009 | R1 | NORMAL (SPIN UP) | 2007/06/08 09:00 | POWER SAVING (HALF SPIN DOWN) | |
| | 010 | R5 | POWER SAVING (SPIN UP IN PROCESSING) | | POWER SAVING (PARTIAL SPIN DOWN) | 2007/06/08 09:00 |
| | 011 | R1 | NORMAL (SPIN UP) | 2007/06/08 08:00 | | 2007/06/08 08:00 |
| | 012 | R6 | NORMAL (SPIN UP) | 2007/06/08 05:00 | POWER SAVING (COMPLETE SPIN DOWN) | |
| | 013 | R5 | POWER SAVING (PARTIAL SPIN DOWN) | | POWER SAVING (HALF SPIN DOWN) | |
| | 014 | R6 | NORMAL (SPIN UP) | | | |
| | 015 | R1 | NORMAL (SPIN UP) | | | 2007/06/08 05:00 |
| | 016 | R5 | POWER SAVING (PARTIAL SPIN DOWN) | 2007/06/07 23:00 | POWER SAVING (HALF SPIN DOWN) | 2007/06/07 23:00 |
| STORAGE 02 (EXTERNAL STORAGE) | 001 | R1 | NORMAL (SPIN UP) | | | |
| | 002 | R5 | POWER SAVING (SPIN DOWN IN PROCESSING) | | POWER SAVING (PARTIAL SPIN DOWN) | |
| | 003 | R1 | NORMAL (SPIN UP) | | | |
| | 004 | R1 | POWER SAVING (HALF SPIN DOWN) | | | 2007/06/08 10:00 |

FIG.17

| STORAGE APPARATUS | CONTENTS | SETTING | |
|---|---|---|---|
| STORAGE 01 | HDD SPIN DOWN | ○ OFF | ● ON |
| | >COMPLETE SPIN DOWN | ○ OFF | ● ON |
| | >PARTIAL/HALF SPIN DOWN | ● OFF | ○ ON |
| | DELAYED RESPONSE | ○ OFF | ● ON |
| | JOURNAL RESPONSE | ○ OFF | ● ON |
| STORAGE 02 (EXTERNAL STORAGE) | HDD SPIN DOWN | ○ OFF | ● ON |
| | >COMPLETE SPIN DOWN | ○ OFF | ● ON |
| | >PARTIAL/HALF SPIN DOWN | ○ OFF | ● ON |
| | DELAYED RESPONSE | ○ OFF | ● ON |
| | JOURNAL RESPONSE | ○ OFF | ● ON |

| STORAGE APPARATUS | RAID GROUP | RAID LEVEL | STATUS (CURRENT) |
|---|---|---|---|
| STORAGE 01 | 001 | R5 | NORMAL (SPIN UP) |
| | 002 | R6 | POWER SAVING (PARTIAL SPIN DOWN) |
| | 003 | R1 | NORMAL (SPIN UP) |
| | 004 | R1 | NORMAL (SPIN UP) |
| | 005 | R5 | NORMAL (SPIN UP) |
| | 006 | R1 | POWER SAVING (SPIN DOWN IN PROCESSING) |
| | 007 | R6 | POWER SAVING (COMPLETE SPIN DOWN) |
| | 008 | R1 | POWER SAVING (HALF SPIN DOWN) |
| | 009 | R1 | NORMAL (SPIN UP) |
| | 010 | R5 | POWER SAVING (SPIN UP IN PROCESSING) |
| | 011 | R1 | NORMAL (SPIN UP) |
| | 012 | R6 | NORMAL (SPIN UP) |
| | 013 | R5 | POWER SAVING (PARTIAL SPIN DOWN) |
| | 014 | R6 | NORMAL (SPIN UP) |
| | 015 | R1 | NORMAL (SPIN UP) |
| | 016 | R5 | POWER SAVING (PARTIAL SPIN DOWN) |
| STORAGE 02 (EXTERNAL STORAGE) | 001 | R1 | NORMAL (SPIN UP) |
| | 002 | R5 | POWER SAVING (SPIN DOWN IN PROCESSING) |
| | 003 | R1 | NORMAL (SPIN UP) |
| | 004 | R1 | POWER SAVING (HALF SPIN DOWN) |

FIG.19

| STORAGE APPARATUS | RAID GROUP | RAID LEVEL | SPIN DOWN | | SPIN UP |
|---|---|---|---|---|---|
| | | | START DATE AND TIME | STATUS | START DATE AND TIME |
| STORAGE 01 | 001 | R5 | 2007/06/08 07:00 | POWER SAVING (PARTIAL SPIN DOWN) | |
| | 002 | R6 | | | 2007/06/08 07:00 |
| | 003 | R1 | 2007/06/07 23:00 | POWER SAVING (HALF SPIN DOWN) | |
| | 004 | R1 | 2007/06/08 06:00 | POWER SAVING (HALF SPIN DOWN) | |
| | 005 | R5 | 2007/06/07 17:00 | POWER SAVING (COMPLETE SPIN DOWN) | 2007/06/07 23:00 |
| | 006 | R1 | | | |
| | 007 | R6 | | | |
| | 008 | R1 | | | 2007/06/07 17:00 |
| | 009 | R1 | 2007/06/08 09:00 | POWER SAVING (HALF SPIN DOWN) | |
| | 010 | R5 | | | 2007/06/08 09:00 |
| | 011 | R1 | 2007/06/08 08:00 | POWER SAVING (PARTIAL SPIN DOWN) | |
| | 012 | R6 | 2007/06/08 05:00 | POWER SAVING (HALF SPIN DOWN) | |
| | 013 | R5 | | | 2007/06/08 08:00 |
| | 014 | R6 | | POWER SAVING (COMPLETE SPIN DOWN) | |
| | 015 | R1 | | | 2007/06/08 05:00 |
| | 016 | R5 | | | |
| STORAGE 02 (EXTERNAL STORAGE) | 001 | R1 | 2007/06/07 23:00 | POWER SAVING (HALF SPIN DOWN) | |
| | 002 | R5 | | | 2007/06/07 23:00 |
| | 003 | R1 | | POWER SAVING (PARTIAL SPIN DOWN) | |
| | 004 | R1 | | | 2007/06/08 10:00 |

STORAGE APPARATUS AND POWER SAVING METHOD THEREOF

CROSS REFERENCES

This application relates to and claims priority from Japanese Patent Application No. 2007-248521, filed on Sep. 26, 2007, the entire disclosure of which is incorporated herein by reference.

BACKGROUND

The present invention generally relates to a storage apparatus and its power saving method, and in particular relates to a storage apparatus connected to a host system for sending and receiving data to and from the foregoing host system, and to the power saving method of such a storage apparatus.

In recent years, information society is rapidly developing, and the computerization of information is also rapidly advancing. Under these circumstances, the importance of storage apparatuses that store electronic information goods is increasing, and the capacity of such storage apparatuses is ever increasing.

Meanwhile, the operation costs of storage apparatuses are becoming a problem, and the current status is that needs for realizing the power saving of storage apparatuses are increasing.

Thus, a storage apparatus that seeks power saving by spinning down the HDD (Hard Disk Drive) when a fixed standby time is set in the memory of the storage apparatus and there is no access during the foregoing standby time has been proposed (for instance, refer to Japanese Patent Laid-Open Publication No. 2000-100053).

Further, a storage apparatus that seeks power saving by designating a given period of time in the storage apparatus, and switching to a power saving mode or shutting off the power when there is no access during the foregoing designated time has been proposed (for instance, refer to Japanese Patent Laid-Open Publication No. 2000-293314).

Moreover, a storage apparatus that seeks power saving by equipping a power supply device to each storage apparatus case, and turning on or turning off the power of each case has been proposed (for instance, refer to Japanese Patent Laid-Open Publication No. 2004-348876).

Nevertheless, when there is access to a storage apparatus in which the HDD is stopped for power saving, there is a problem in that it takes much time to start the HDD, and there will be no response to the access request, or the response to the access request will be delayed.

SUMMARY

The present invention was devised in view of the foregoing problems. Thus, an object of this invention is to provide a storage apparatus and its power saving method capable of preventing the deterioration in the response time to an access request, and realizing a power saving effect.

In order to achieve the foregoing object, the present invention provides a storage apparatus connected to a host system for sending and receiving data to and from the host system. This storage apparatus includes a data storage unit for storing write data requested by the host system, an access history storage unit for storing, when there is a write request for writing data into the data storage unit or a read request for reading data stored in the data storage unit, history of the write request or read request as access history, an operational information storage unit for storing operational information showing whether the data storage unit is operating, an access prediction unit for predicting whether the data storage unit will be accessed based on the access history, and an operational control unit for performing operational control of pre-starting the data storage unit when the data storage unit is shut off and the access prediction unit predicts that the data storage unit will be accessed, or stopping the data storage unit when the data storage unit is operating and the access prediction unit predicts that the data storage unit will not be accessed.

As a result of the foregoing configuration, the data storage unit stores the write data requested by the host system. The access history storage unit stores, when there is a write request for writing data into the data storage unit or a read request for reading data stored in the data storage unit, history of the write request or read request as access history. The operational information storage unit stores operational information showing whether the data storage unit is operating. The access prediction unit predicts whether the data storage unit will be accessed based on the access history. The operational control unit performs operational control of pre-starting the data storage unit when the data storage unit is shut off and the access prediction unit predicts that the data storage unit will be accessed, or stopping the data storage unit when the data storage unit is operating and the access prediction unit predicts that the data storage unit will not be accessed.

The present invention additionally provides a power saving method of a storage apparatus connected to a host system for sending and receiving data to and from the host system. This power saving method includes a step of a data storage unit storing write data requested by the host system, a step of an access history storage unit storing, when there is a write request for writing data into the data storage unit or a read request for reading data stored in the data storage unit, history of the write request or read request as access history, a step of an operational information storage unit storing operational information showing whether the data storage unit is operating, a step of an access prediction unit predicting whether the data storage unit will be accessed based on the access history, and a step of an operational control unit performing operational control of pre-starting the data storage unit when the data storage unit is shut off and the access prediction unit predicts that the data storage unit will be accessed, or stopping the data storage unit when the data storage unit is operating and the access prediction unit predicts that the data storage unit will not be accessed.

As a result of the foregoing configuration, the data storage unit stores the write data requested by the host system. The access history storage unit stores, when there is a write request for writing data into the data storage unit or a read request for reading data stored in the data storage unit, history of the write request or read request as access history. The operational information storage unit stores operational information showing whether the data storage unit is operating. The access prediction unit predicts whether the data storage unit will be accessed based on the access history. The operational control unit performs operational control of pre-starting the data storage unit when the data storage unit is shut off and the access prediction unit predicts that the data storage unit will be accessed, or stopping the data storage unit when the data storage unit is operating and the access prediction unit predicts that the data storage unit will not be accessed.

According to the storage apparatus and its power saving method of the present invention, it is possible to predict the next access based on access history. Thus, when access is predicted, it is possible to prevent the deterioration in the response time when the data storage unit is accessed by pre-starting such data storage unit, and it is also possible to realize a power saving effect by stopping the data storage unit when no access is predicted.

DESCRIPTION OF DRAWINGS

FIG. 6 is a schematic diagram showing a configuration example of an access history management table;

FIG. 7 is a schematic diagram showing a configuration example of a power saving status management table;

FIG. 17 is a diagram showing a screen display example of a power saving function setting screen;

FIG. 18 is a diagram showing a screen display example of a status information screen;

FIG. 19 is a diagram showing a screen display example of a schedule information screen.

DETAILED DESCRIPTION

The storage apparatus of the present invention accumulates access history from the host device, determines a power saving schedule according to the foregoing access history, and performs power saving processing according to that schedule.

In addition to performing the control for power saving (for example, turning off (OFF) the power of the HDD (Hard Disk Drive)), the present invention is also able to perform processing for starting the HDD in a power saving status according to the schedule that is based on the foregoing access history.

For instance, in a case where there is a RAID group (described later) in which access is expected at a specific time, the access performance with the host device can be improved by starting the HDD (or putting the HDD in a standby status) of the RAID group before it is accessed.

Embodiments of the present invention are now explained in detail with reference to the attached drawings.

Figure 1:
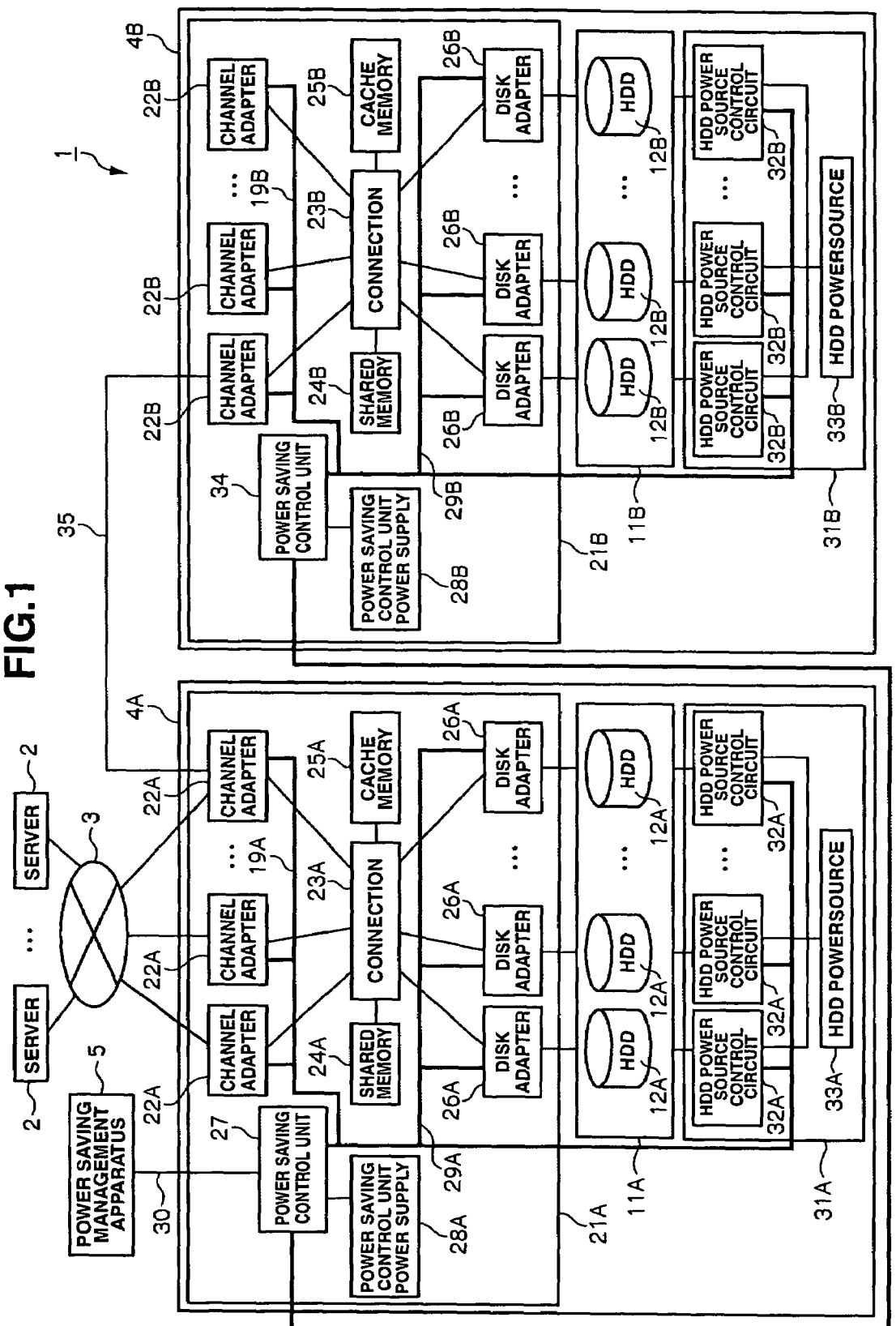
FIG. 1 is a diagram showing the overall configuration of a storage system according to an embodiment of the present invention.

FIG. 1 is a diagram showing the overall configuration according to an embodiment of the present invention.

As shown in FIG. 1, a storage system 1 is configured by a server 2 being connected to a higher level storage apparatus 4A via a network 3, and a lower level storage apparatus 4B being connected to the higher level storage apparatus 4A. In addition, with the storage system 1, a power saving management apparatus 5 is connected to the higher level storage apparatus 4A.

The power saving management apparatus 5 for managing the power saving of the server 2 as a host system and the storage apparatuses 4A, 4B is a computer device comprising information processing resources such as a CPU (Central Processing Unit) and a memory, and, for instance, is configured from a personal computer or a workstation.

In addition, the server 2 and the power saving management apparatus 5 comprise an information input device (not shown) such as a keyboard, a switch, a pointing device, or a microphone, and an information output device (not shown) such as a monitor display or a speaker.

The server 2 is able to input and output data to and from the storage apparatus 4A via the network 3. The network 3, for example, is configured from a SAN (Storage Area Network). As the network 3, a LAN (Local Area Network), Internet, a dedicated line, a public line or the like may be used arbitrarily.

Communication between the server 2 and the storage apparatus 4A via the network 3, for instance, is conducted according to a fibre channel protocol when the network 3 is a SAN, and conducted according to a TCP/IP (Transmission Control Protocol/Internet Protocol) protocol when the network 3 is a LAN.

The higher level storage apparatus 4A has a function of virtualizing the storage area provided by the lower level storage apparatus 4B to the server 2, and comprises a storage device unit 11A configured from a plurality of HDDs 12A for storing data, a control unit 21A for controlling the input and output of data to and from the storage device unit 11A, and an HDD power supply control unit 31A for controlling the supply of power to the HDDs 12A of the storage device unit 11A.

Among the above, as the HDDs 12A of the storage device unit 11A, for example, expensive disks such as SCSI (Small Computer System Interface) disks or inexpensive disks such as SATA (Serial AT Attachment) disks or optical disks can be used.

The HDDs 12A of the storage device unit 11A are operated according to a RAID system by the control unit 21A. In the present invention, a RAID configuration such as RAID 1, RAID 5 or RAID 6 can be realized by combining a plurality of HDDs 12A, and one or more logical volumes (these are hereinafter referred to as "logical volumes (described later)") are set in the physical storage area (hereinafter referred to as the RAID group 124 (described later))") provided by one or more HDDs 12A.

Data is stored in the logical volumes according to block (this is hereinafter referred to as a "logical block") units of a prescribed size. A unique identifier (this is hereinafter referred to as an "LU (Logical Unit)") is given to each logical volume. In the case of this embodiment, the input and output of data are performed by setting the combination of the foregoing LU and a number (LBA: Logical Block Address) that is unique to the respective logical blocks as the address, and designating this address.

Figure 2:
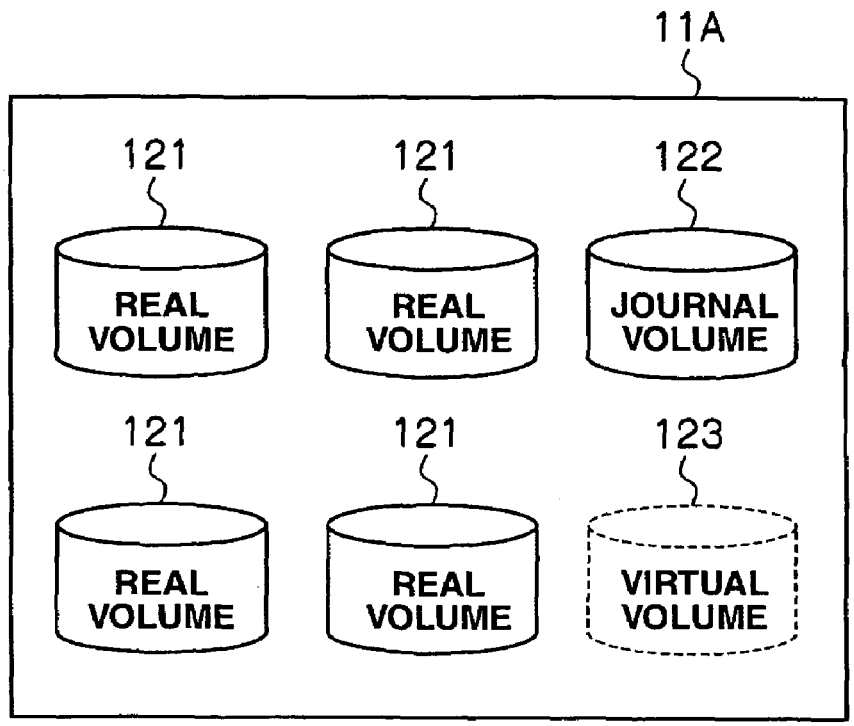
FIG. 2 is a schematic diagram of a logical volume.

FIG. 2 is a schematic diagram of a logical volume according to the present embodiment. With the higher level storage apparatus 4A, attributes of the logical volumes are broadly classified into a real volume 121 and a journal volume 122 as the logical volumes configured from the HDDs 12A of the higher level storage apparatus 4A, and a virtual volume 123 as a virtual logical volume configured from the HDDs 12B of the lower level storage apparatus 4B.

The HDD 12A of the real volume 121 and the HDD 12B of the virtual volume 123 are able to store data or store the parity data created from the stored data according to the type of RAID configuration (described later).

When certain HDDs 12A of the RAID configuration of the real volume and certain HDDs 12B of the RAID configuration of the virtual volume 123 are stopped, and there is a write request from the server 2 to the stopped real volume 121 and the virtual volume 123, the journal volume 122 writes and temporarily stores the data received from the server 2.

When the foregoing write request is made, start-up of certain HDDs 12A of the RAID configuration of the real volume 121 and certain HDDs 12B of the RAID configuration of the virtual volume 123 subject to a write request is commenced, and, when the HDDs 12A and the HDDs 12B are started, the temporarily stored data is read from the journal volume 122, and then written into the real volume 121 and the virtual volume 123 (described later).

Returning to FIG. 1, the control unit 21A comprises a plurality of channel adapters 22A, a connection 23A, a shared memory 24A, a cache memory 25A, a plurality of disk adapters 26A, a power saving control unit 27, and a power saving control unit power supply 28A.

Each channel adapter 22A is configured as a microcomputer system comprising a microprocessor, a memory, a communication interface and the like, and comprises a port for connecting to the network 3 and the lower level storage apparatus 4B.

When the network, 3 is a SAN, for example, the channel adapter 22A interprets various commands sent from the server 2 via the network 3 and executes corresponding processing. A network address (WWN for instance) for identifying the respective ports is allocated to the port of each channel adapter 22A. Meanwhile, when the network 3 is a LAN, each channel adapter 22A may individually function as a NAS (Network Attached Storage).

The connection 23A is connected to the channel adapters 22A, the shared memory 24A, the cache memory 25A, and the disk adapters 26A. The transfer of data and commands among the channel adapters 22A, the shared memory 24A, the cache memory 25A, and the disk adapters 26A is conducted via the connection 23A. The connection 23A, for example, is configured from a switch such as an ultra-fast crossbar switch or a bus for performing the data transfer by way of high-speed switching.

The shared memory 24A and the cache memory 25A are storage memories to be shared by the channel adapters 22A and the disk adapters 26A. The shared memory 24A is primarily used for storing the system configuration information and commands concerning the overall configuration of the higher level storage apparatus 4A. The cache memory 25A is primarily used for temporarily storing data to be input to and output from the higher level storage apparatus 4A.

The respective disk adapters 26A are configured as a microcomputer system comprising a microprocessor, a memory and the like, and function as an interface for performing protocol control during the communication with the HDDs 12A in the storage device unit 11A. The disk adapters 26A, for example, are connected to the corresponding HDDs 12A in the storage device unit 11A via a fibre channel cable, and transfer data to and from the HDDs 12A according to a fibre channel protocol.

Figure 3:
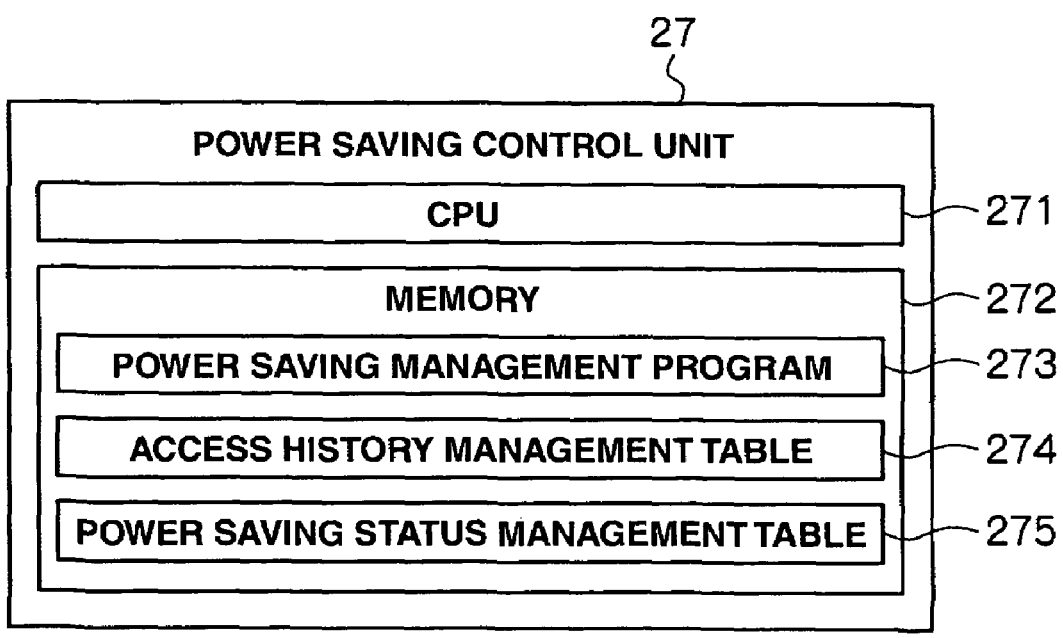
FIG. 3 is a schematic diagram of a power saving control unit.

FIG. 3 is a schematic diagram of the power saving control unit 27 according to the present embodiment. The power saving control unit 27 is configured as a microcomputer system comprising a CPU 271, a memory 272, a communication interface (not shown), and so on.

The power saving control unit 27 controls the power saving of the higher level storage apparatus 4A. The memory 272 of the power saving control unit 27 stores a power saving management program 273, an access history management table 274, and a power saving status management table 275.

When a data I/O request to the RAID group 124 of the storage device unit 11A is given to the channel adapter 22A, the power saving control unit 27 stores such request as access history in the access history management table 274.

The power saving control unit 27 reads the access history at a prescribed timing by executing the power saving management program 273, and stores the spin down schedule in the power saving status management table 275 when it is determined that there is no access from the server 2 to the storage device unit 11A, sends a power stop signal to the HDD power supply control circuit 32A or the power saving control unit 34 (described later) at a prescribed time according to the power saving status management table 275, and stops the operation of the corresponding HDD 12A of the storage device unit 11A or the corresponding HDD 12B of the storage device unit 11B.

Further, the power saving control unit 27 reads the access history at a prescribed timing by executing the power saving management program 273, and stores the spin down schedule in the power saving status management table 275 when it is determined that there is access from the server 2 to the storage device unit 11A, sends a power supply signal to the HDD power supply control circuit 32A or the power saving control unit 34 (described later) at a prescribed timing according to the power saving status management table 275, and starts the operation of the corresponding HDD 12A of the storage device unit 11A or the corresponding HDD 12B of the storage device unit 11B.

The specific processing based on the power saving management program 273 will be described later. The specific configuration of the access history management table 274 and the power saving status management table 275 will also be described later.

Returning to FIG. 1, the power saving control unit 27 is connected to the respective channel adapters 22A, disk adapters 26A and HDD power supply control circuits 32A (described later) via a network 29A such as a LAN. The power saving control unit 27 is also connected to the power saving management apparatus 5 via a network 30 such as a LAN.

The power saving control unit power supply 28A controls the power supply to the power saving control unit 27. The power saving control unit power supply 28A is provided separately from the HDD power supply control unit 31A, and is thereby able to supply power to the power saving control unit 27 even when the power of the HDD power supply control unit 31A turned off and cause the power saving control unit 27 to function.

The HDD power supply control unit 31A comprises a plurality of HDD power supply control circuits 32A and an HDD power supply 33A.

The HDD power supply control circuit 32A is a circuit for controlling the power supply to the storage device unit 11A. The HDD power supply control circuit 32A is configured so that it can control the power of each HDD 12A. The HDD power supply 33A supplies power to the HDD 12A.

The lower level storage apparatus 4B is configured the same as the higher level storage apparatus 4A other than the power saving control unit 34 (described later). In FIG. 1, suffix "B" is added in place of suffix "A" to the respective constituent elements of the lower level storage apparatus 4B that are the same as the constituent elements of the higher level storage apparatus 4A.

With the lower level storage apparatus 4B, one channel adapter 22B is connected to one of the channel adapters 22A of the higher level storage apparatus 4A via a cable 35 such as a fibre channel cable or a LAN cable, and is thereby able to send and receive necessary commands and data to and from the higher level storage apparatus 4A through the cable 35.

The power saving control unit 34 of the lower level storage apparatus 4B is configured as a microcomputer system as with the foregoing power saving control unit 27. While the power saving control unit 34 stops the operation of the corresponding HDD 12B of the storage device unit 11B based on the power stop signal sent from the power saving control unit 27 on the one hand, it starts the operation of the corresponding HDD 12B of the storage device unit 11B based on the power supply signal.

Moreover, the power saving control unit 34 of the lower level storage apparatus 4B is connected to the power saving control unit 27 of the higher level storage apparatus 4A via a network 36 such as a LAN, and the power saving control unit 34 of the lower level storage apparatus 4B and the power saving control unit 27 of the higher level storage apparatus 4A are thereby able to send and receive necessary information through the network 36.

The power saving management apparatus 5 is a terminal device for controlling the overall operation of the storage system 1, and manages the power saving of the storage apparatuses 4A, 4B via the power saving control units 27, 34 by displaying a power saving management screen or the like on a self-display and setting the power setting mode according to the operator's operations.

The flow of input and output of data between the server 2 and the higher level storage apparatus 4A and lower level storage apparatus 4B in the storage system 1 is now explained.

When a command for writing data into the logical volume set to the higher level storage apparatus 4A or the lower level storage apparatus 4B is input to the server 2 according to the user's operations, the server 2 sends the corresponding data write request and data to be written to a prescribed channel adapter 22A of the higher level storage apparatus 4A.

The data write request includes a virtual address to which the write-target data is to be written, and this virtual address is a combination of a virtual LU given to the respective logical volumes set in the storage areas provided respectively by the higher level storage apparatus 4A and the lower level storage apparatus 4B, and a virtual LBA given to all logical blocks in the foregoing storage areas according to a serial number.

The channel adapter 22A of the higher level storage apparatus 4A that received the data write request changes the virtual address to be written with the data designated in the data write request to an actual address recognized by the higher level storage apparatus 4A and the lower level storage apparatus 4B.

As a means for realizing the foregoing change, the shared memory 24A of the higher level storage apparatus 4A stores an address mapping table that associates the actual address of the storage areas provided by the higher level storage apparatus 4A and the lower level storage apparatus 4B, and the virtualized address of such storage areas recognized by the server 2.

The channel adapter 22A refers to the address mapping table and rewrites the virtual address to be written with the data contained in the data write request into the actual address recognized by the higher level storage apparatus 4A and the lower level storage apparatus 4B.

When the rewritten address is an address in the storage area provided by the higher level storage apparatus 4A, the channel adapter 22A writes the data write request into the shared memory 24A. The channel adapter 22A also writes the data to be written into the cache memory 25A.

Here, the disk adapter 26A is constantly monitoring the shared memory 24A. When the corresponding disk adapter 26A detects that the data write request has been written into the shared memory 24A, it converts the data write request based on the designation of a virtual logical address into a data write request based on the designation of an actual physical address.

The disk adapter 26A additionally reads write-target data from the cache memory 25A, and writes such write-target data into a corresponding address location of the corresponding HDD 12A.

Meanwhile, when the address contained in the rewritten data write request is an address in the storage area provided by the lower level storage apparatus 4B, the channel adapter 22A sends the foregoing data write request and the data to be written to the lower level storage apparatus 4B through the channel adapter 22A connected to the lower level storage apparatus 4B.

The channel adapter 22B of the lower level storage apparatus 4B that received the foregoing data write request writes such data write request into the shared memory 24B, and also writes the write-target data into the cache memory 25B.

The data write request is thereafter read by the corresponding disk adapter 26B. The disk adapter 26B converts the data write request based on a logical address designation into a data write request based on a physical address designation, reads the write-target data from the cache memory 25B, and writes such write-target data into the corresponding address location of the corresponding HDD 12B.

Meanwhile, when a command for reading data stored in a prescribed logical volume in the higher level storage apparatus 4A is input to the server 2 according to the user's operations, the server 2 sends the corresponding data read request to a prescribed channel adapter 22A of the higher level storage apparatus 4A. In this case also, the data read request includes a virtual address of the location where the read-target data is written.

The channel adapter 22A of the higher level storage apparatus 4A that received the data read request changes the virtual address for reading the data contained in the data read request to an actual address recognized by the higher level storage apparatus 4A and the lower level storage apparatus 4B using the foregoing address mapping table.

When the rewritten address is an address in the storage area provided by the higher level storage apparatus 4A, the channel adapter 22A writes the data read request into the shared memory 24A.

When the corresponding disk adapter 26A detects that the data read request has been written into the shared memory 24A, it converts the data read request based on the designation of a virtual logical address into a data read request based on the designation of an actual physical address, and reads the designated data from the corresponding address location of the corresponding HDD 12A based on the foregoing address.

The disk adapter 26A additionally writes the data read from the HDD 12A into the cache memory 25A, and writes the read command into the shared memory 24A.

Here, the channel adapter 22A is constantly monitoring the shared memory 24A. When the channel adapter 22A detects that the read command has been written into the shared memory 24A, it reads the corresponding data from the cache memory 25A according to the foregoing read command, and sends such data to the corresponding server 2 via the network 3.

Meanwhile, when the address contained in the rewritten data read request is an address in the storage area provided by the lower level storage apparatus 4B, the channel adapter 22A sends the foregoing data read request to the lower level storage apparatus 4B through the channel adapter 22A connected to the lower level storage apparatus 4B.

The channel adapter 22B of the lower level storage apparatus 4B that received the foregoing data read request writes such data read request into the shared memory 24B. The data read request is thereby read by the corresponding disk adapter 26B.

The disk adapter 26B converts the data read request based on a logical address designation into a data read request based on a physical address designation, and reads the designated data from the corresponding address location of the corresponding HDD 12B based on the foregoing address.

The disk adapter 26B additionally writes the data read from the HDD 12B into the cache memory 25B, and writes the read command into the shared memory 24B.

Here, the channel adapter 22B is constantly monitoring the shared memory 24B. When the corresponding channel adapter 22B detects that the read command has been written into the shared memory 24B, it reads the corresponding data from the cache memory 25B according to the foregoing read command, and sends such data to the higher level storage apparatus 4A.

As a result, the data is sent to the corresponding server 2 by sequentially going through the higher level storage apparatus 4A and the network 3.

As described above, the storage system 1 is able to read and write data from and into the storage area (real volume 121, virtual volume 123) provided by the higher level storage apparatus 4A or the lower level storage apparatus 4B according to the data I/O request from the server 2 while using the higher level storage apparatus 4A (virtual volume 123) to virtualize the storage area provided by the lower level storage apparatus 4B.

The processing function of the power saving control unit 27 is now explained.

Figure 4:
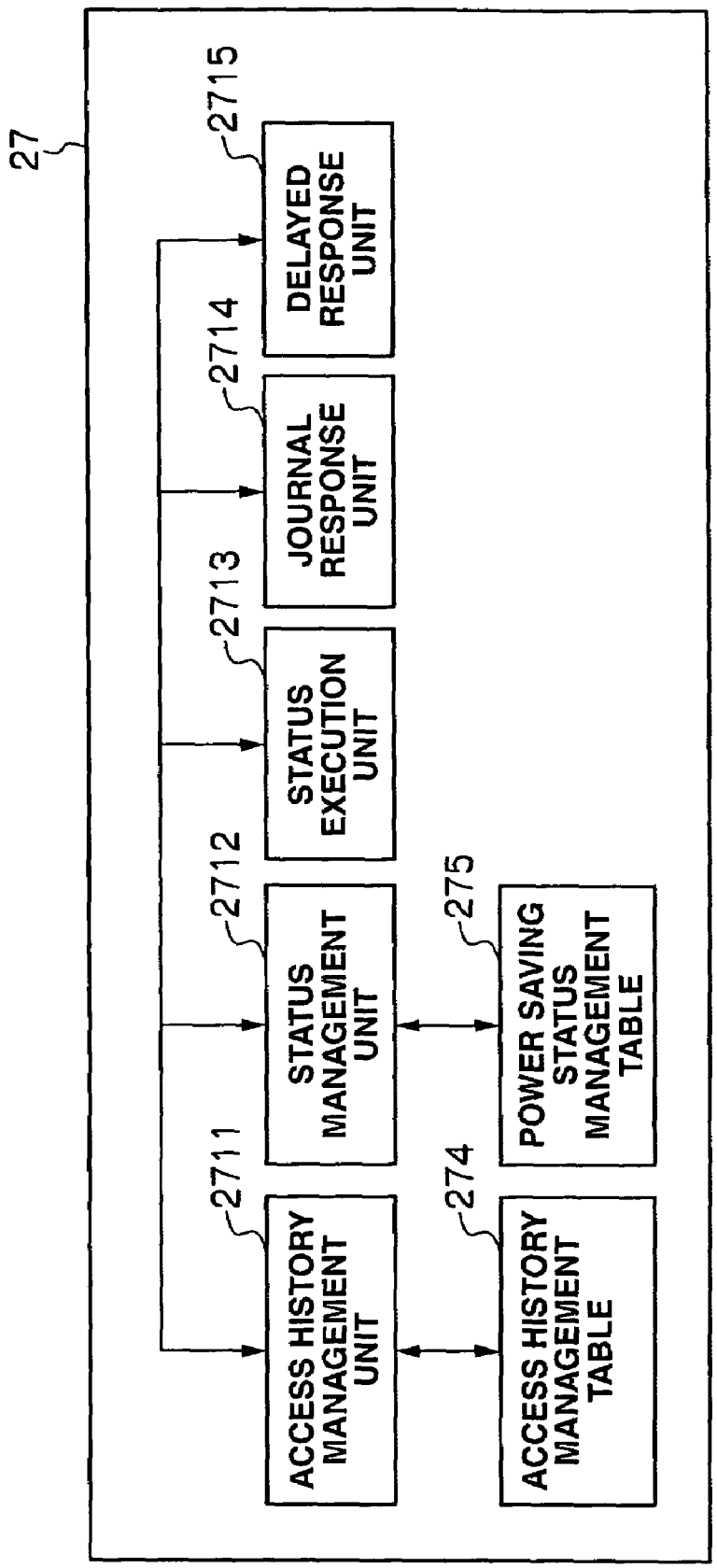
FIG. 4 is a diagram showing a processing function of the power saving control unit.

FIG. 4 is a schematic diagram showing the processing function of the power saving control unit 27.

In order to clarify the processing contents of the CPU 271 of the power saving control unit 27 based on the power saving management program 273 in the ensuing explanation, the subject to execute the various types of processing is explained as the respective components representing the functions to be realized by the CPU 271 of the power saving control unit 27 executing the power saving management program 273. In reality, however, it goes without saying that the CPU 271 of the power saving control unit 27 performs such processing based on the power saving management program 273.

As shown in FIG. 4, the power saving control unit 27 can be broadly classified into an access history management unit 2711, a status management unit 2712, a status execution unit 2713, a journal response unit 2714, and a delayed response unit 2715.

The access history management unit 2711 is monitoring the channel adapter 22A, and when the channel adapter 22A receives a data I/O request to the RAID group 124, it stores such data I/O request as access history in the access history management table 274.

When the channel adapter 22A receives the data I/O request to the RAID group 124, the access history management unit 2711 reads the operational status of the RAID group 124 subject to the data I/O request from the power saving status management table 275 through the status management unit 2712.

The status management unit 2712 acquires the access history from the access history management table 274 through the access history management unit 2711 in prescribed intervals (every hour, for instance), predicts whether a data I/O request will be issued from the server 2 to the RAID group 124 based on the acquired access history, and stores such prediction in the power saving status management table 275.

When it is predicted that a data I/O request will be made from the server 2 to the RAID group 124 based on the power saving status management table 275 and the RAID group 124 is shut off, the status execution unit 2713 issues a start-up command to the corresponding HDD power supply control circuit 32A or power saving control unit 34 so as to start the HDD 12A, HDD 12B of the RAID group 124 before the predicted time of the data I/O request. The power saving control unit 34 issues a start-up command to the corresponding HDD power supply control circuit 32B to start the HDD 12B based on the foregoing start-up command.

When the status execution unit 2713 issues a start-up command to the HDD power supply control circuit 32A or the power saving control unit 34 and the start-up of the HDD 12A, HDD 12B is complete, it stores the operational status at the time of start-up in the power saving status management table 275 through the status management unit 2712.

When it is predicted that a data I/O request will not be issued from the server 2 to the RAID group 124 based on the power saving status management table 275 and the RAID group 124 is operating, the status execution unit 2713 issues a stop command to the corresponding HDD power supply control circuit 32A or power saving control unit 34 to stop the HDD 12A, HDD 12B of the RAID group 124. The power saving control unit 34 issues a stop command to the corresponding HDD power supply control circuit 32B to stop the HDD 12B based on the foregoing stop command.

When the status execution unit 2713 issues a stop command to the HDD power supply control circuit 32A or the power saving control unit 34 and the shut-off of the HDD 12A, HDD 12B is complete, it stores the operational status at the time of shut-off in the power saving status management table 275 through the status management unit 2712.

When the journal response unit 2714 receives a notice to the effect that the corresponding HDD 12A, 12B of the storage device unit 11A, 11B subject to the data write request has been shut off from the status execution unit 2713 that read the operational status of the RAID group 124 subject to the data I/O request, it commands the channel adapter 22A to temporarily store the data received from the server 2 in the journal volume 122.

When the delayed response unit 2715 receives a notice to the effect that the corresponding HDD 12A, 12B of the storage device unit 11A, 11B subject to the data read request has been shut off from the status execution unit 2713 that read the operational status of the RAID group 124 subject to the data I/O request, it commands the channel adapter 22A to refrain from sending a signal (Not Ready signal) for a given period of time indicating that the RAID group 124 is shut off.

A partial spin down is now explained.

Figure 5:
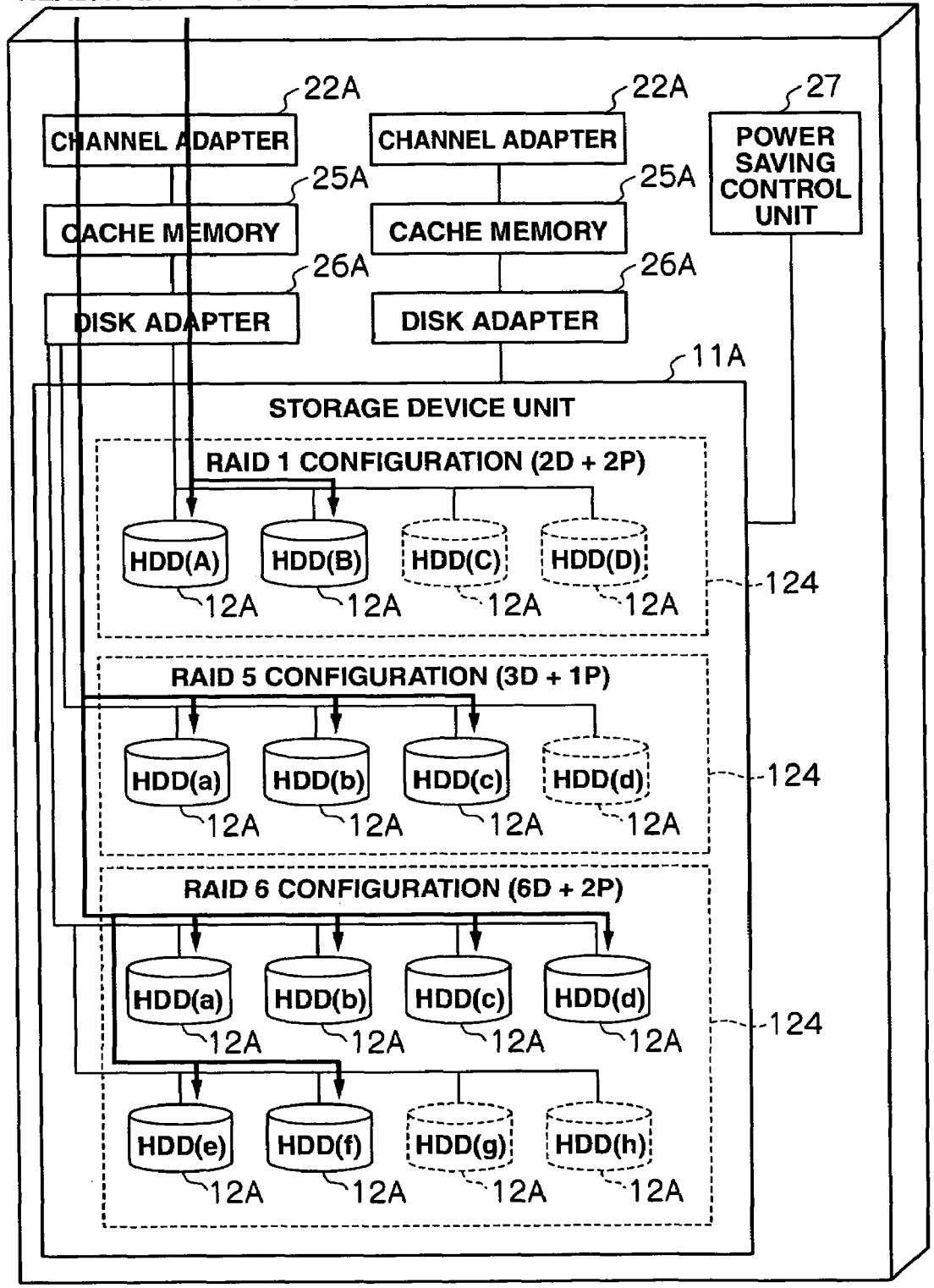
FIG. 5 is a schematic diagram of a higher level storage apparatus explaining a partial spin down.

FIG. 5 is a schematic diagram of the higher level storage apparatus 4A explaining a partial spin down.

When the RAID configuration is the RAID group 124 configured from a plurality of HDDs 12A, data stored in the RAID group 124 can be input and output even if a prescribed HDD 12A is spun down.

Thus, when it is highly unlikely that an I/O request will be made but there is a slight possibility that a data I/O request may be issued, or when it is essential to prevent the deterioration in the response time, a partial spin down can be performed to prevent the deterioration in the response time while realizing a power saving effect.

Contrary to a partial spin down, the act of spinning down all HDDs 12A (RAID group 124) of the RAID configuration is hereinafter referred to as a complete spin down.

Foremost, as shown in FIG. 5, a case is explained where a plurality of HDDs 12A are configuring the RAID group 124 in a RAID 1 configuration; specifically, a case where data of the HDD 12A(A) is mirrored to the HDD 12A(C), and data of the HDD 12A(B) is mirrored to the HDD 12A(D). In FIG. 5, although a case is explained regarding the RAID group 124 having a RAID 1 configuration of 2D+2P, it goes without saying that the present invention can be applied to a RAID group 124 having a RAID 1 configuration of nD+nP.

Here, with the higher level storage apparatus 4A, even if the HDD 12A(C) and the HDD 12A(D) are stopped, since the HDD 12A(A) and the HDD 12A(B) store the same data as the HDD 12A(C) and the HDD 12A(D), data can be input and output even if a data I/O request is issued to the HDD 12A(A) and the HDD 12A(B).

In other words, with the higher level storage apparatus 4A, even if the HDD 12A(C) and the HDD 12A(D) are stopped, the response time to the data I/O request can be made the same as the response time when all HDDs 12A(A)(B)(C)(D) are operating.

Meanwhile, with the higher level storage apparatus 4A, since the HDD 12A(C) and the HDD 12A(D) are stopped, it is possible to realize a power saving effect in comparison to a case when all HDDs 12A(A)(B)(C)(D) are operating.

The partial spin down of spinning down only the mirror-side HDD 12A (for instance, HDD 12A(C) and HDD 12A(D)) of the RAID group 124 having a RAID 1 configuration is hereinafter referred to as a half spin down.

With the higher level storage apparatus 4A, when data is input or output while the HDD 12A(C) and the HDD 12A(D) are in a spin down status (RAID group 124 is in a half spin down status), the HDD 12A(C) and the HDD 12A(D) are started with the data I/O request as the trigger.

After the HDD 12A(C) and the HDD 12A(D) are started, the higher level storage apparatus 4A reflects the difference of data exchanged up to the start-up time.

In the foregoing case, with the higher level storage apparatus 4A, the difference of data when the HDD 12A(C) and the HDD 12A(D) are in a spin down status (RAID group 124 is in a half spin down status) is stored in the cache memory 25A.

Specifically, with the higher level storage apparatus 4A, the power saving control unit 27 acquires the operational status of the RAID group 124 from the power saving status management table 275.

When it is determined that the HDD 12A(C) and the HDD 12A(D) are in a spin down status (RAID group 124 is in a half spin down status), the higher level storage apparatus 4A commands the channel adapter 22A to exchange data with the HDD 12A(A) and the HDD 12A(B), and simultaneously store the difference of the exchanged data in the cache memory 25A.

With the higher level storage apparatus 4A, when the HDD 12A(C) and the HDD 12A(D) are started, the disk adapter 26A reflects the difference of the data stored in the cache memory 25A to the HDD 12A(C) and the HDD 12A(D).

Subsequently, as shown in FIG. 5, a case is explained where a plurality of HDDs 12A are configuring the RAID group 124 in a RAID 5 configuration; specifically, a case where data is distributed and stored in three arbitrary HDDs 12A among the HDDs 12A(a)(b)(c)(d), and parity data created from the foregoing data is stored in one arbitrary HDD 12A. In FIG. 5, although a case is explained regarding the RAID group 124 having a RAID 5 configuration of 3D+1P, it goes without saying that the present invention can be applied to a RAID group 124 having a RAID 5 configuration of nD+nP.

Here, with the higher level storage apparatus 4A, for example, data can be input and output to and from the HDDs 12A(a)(b)(c) even if the HDD 12A(d) is stopped.

In other words, with the higher level storage apparatus 4A, even if the HDD 12A(d) is stopped, the response time to the data I/O request can be made the same as the response time when all HDDs 12A(a)(b)(c)(d) are operating.

Meanwhile, with the higher level storage apparatus 4A, since the HDD 12A(d) is stopped, it is possible to realize a power saving effect in comparison to a case when all HDDs 12A(a)(b)(c)(d) are operating.

The local spin down of spinning down only one arbitrary HDD 12A (for instance, HDD 12A(d)) of the RAID group 124 having a RAID 5 configuration is hereinafter referred to as a partial spin down.

With the higher level storage apparatus 4A, when data is input or output while the HDD 12A(d) is in a spin down status (RAID group 124 is in a partial spin down status), the HDD 12A(d) is started with the data I/O request as the trigger.

After the HDD 12A(d) is started, the higher level storage apparatus 4A reflects the difference of data exchanged up to the start-up time.

In the foregoing case, with the higher level storage apparatus 4A, the difference of data when the HDD 12A(d) is in a partial spin down status is stored in the cache memory 25A.

Specifically, with the higher level storage apparatus 4A, the power saving control unit 27 acquires the operational status of the RAID group 124 from the power saving status management table 275.

When it is determined that the HDD 12A(d) is in a spin down status (RAID group 124 is in a partial spin down status), the higher level storage apparatus 4A commands the channel adapter 22A to exchange data with the HDDs 12A(a)(b)(c), and simultaneously store the difference of the exchanged data in the cache memory 25A.

With the higher level storage apparatus 4A, when the HDD 12A(d) is started, the disk adapter 26A reflects the difference of the data stored in the cache memory 25A to the HDD 12A(d).

Subsequently, as shown in FIG. 5, a case is explained where a plurality of HDDs 12A are configuring the RAID group 124 in a RAID 6 configuration; specifically, a case where data is distributed and stored in six arbitrary HDDs 12A among the HDDs 12A(a)(b)(c)(d)(e)(f)(g)(h), and parity data created from the foregoing data is stored in two arbitrary HDDs 12A. In FIG. 5, although a case is explained regarding the RAID group 124 having a RAID 6 configuration of 6D+2P, it goes without saying that the present invention can be applied to a RAID group 124 having a RAID 6 configuration of nD+2P.

Here, with the higher level storage apparatus 4A, for example, data can be input and output to and from the HDDs 12A(a)(b)(c)(d)(e)(f) even if the HDD 12A(g) and the HDD 12A(h) are stopped.

In other words, with the higher level storage apparatus 4A, even if the HDD 12A(g) and the HDD 12A(h) are stopped, the response time to the data I/O request can be made the same as the response time when all HDDs 12A(a)(b)(c)(d)(e)(f)(g)(h) are operating.

Meanwhile, with the higher level storage apparatus 4A, since the HDD 12A(g) and the HDD 12A(h) are stopped, it is possible to realize a power saving effect in comparison to a case when all HDDs 12A(a)(b)(c)(d)(e)(f)(g)(h) are operating.

The local spin down of spinning down only two arbitrary HDDs 12A (for instance, HDD 12A(g) and HDD 12A(h)) of the RAID group 124 having a RAID 6 configuration is also referred to as a partial spin down.

With the higher level storage apparatus 4A, when data is input or output while the HDD 12A(g) and the HDD 12A(h) are in a spin down status (RAID group 124 is in a partial spin down status), the HDD 12A(g) and the HDD 12A(h) are started with the data I/O request as the trigger.

After the HDD 12A(g) and the HDD 12A(h) are started, the higher level storage apparatus 4A reflects the difference of data exchanged up to the start-up time.

In the foregoing case, with the higher level storage apparatus 4A, the difference of data when the HDD 12A(g) and the HDD 12A(h) are in a partial spin down status is stored in the cache memory 25A.

Specifically, with the higher level storage apparatus 4A, the power saving control unit 27 acquires the operational status of the RAID group 124 from the power saving status management table 275.

When it is determined that the HDD 12A(g) and the HDD 12A(h) are in a spin down status (RAID group 124 is in a partial spin down status), the higher level storage apparatus 4A commands the channel adapter 22A to exchange data with the HDDs 12A(a)(b)(c)(d)(e)(f), and simultaneously store the difference of the exchanged data in the cache memory 25A.

With the higher level storage apparatus 4A, when the HDD 12A(g) and the HDD 12A(h) are started, the disk adapter 26A reflects the difference of the data stored in the cache memory 25A to the HDD 12A(g) and the HDD 12A(h).

The lower level storage apparatus 4B may also adopt similar RAID configurations as those described above based on the HDDs 12B, and perform the same control as the examples described above.

Specific examples of the various tables stored in the memory 272 of the power saving control unit 27 in the storage apparatus 4A are now explained.

Figure 6:
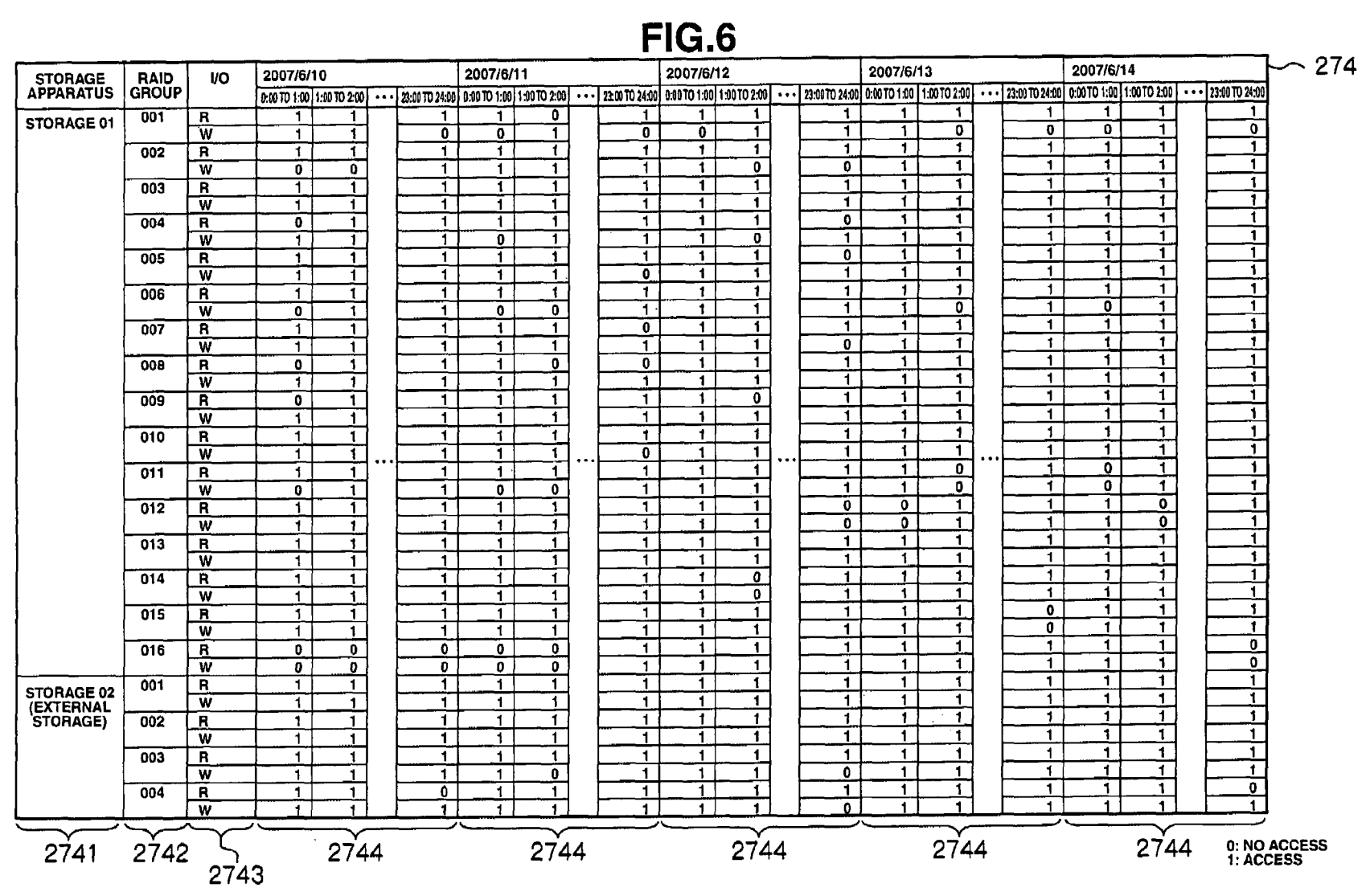

FIG. 6 is a schematic diagram showing a configuration example of the access history management table 274.

The access history management table 274 is provided with various columns; namely, a storage apparatus column 2741, a RAID group column 2742, an I/O column 2743, and a date and time column 2744.

The storage apparatus column 2741 stores the number of the storage apparatus to be subject to the data I/O request. Here, the storage apparatus having a storage apparatus number of "storage 01" represents the higher level storage apparatus 4A, and the storage apparatus having a storage apparatus number of "storage 02" represents the lower level storage apparatus 4B.

The RAID group column 2742 stores the number of the RAID group 124 to be subject to the data I/O request. The number of the RAID group 124 is associated with the number of the storage apparatus.

The I/O column 2743 includes "R" and "W" so that the input or output of data to or from the RAID group 124 can be associated and stored. "R" is a column for setting whether a read request was made, and "W" is a column for setting whether a write request was made. "R" or "W" is associated with each number of the RAID group 124.

The date and time column 2744 is provided with a column for each hour, and stores a number showing whether a data I/O request was made during that hour.

In the example of FIG. 6, "1" showing that there was a write request and a read request is set in the date and time column 2744 of "1 Hour from 0:00 to 1:00 on Jun. 10, 2007" in the RAID group 124 number "001" of the storage apparatus number "storage 01." Furthermore, in the example of FIG. 6, "1" showing that there was a read request and "0" showing that there was no write request are set in the date and time column 2744 of "1 Hour from 0:00 to 1:00 on Jun. 10, 2007" (during the one hour on the same day and same time) in the RAID group 124 number "002" of the storage apparatus number "storage 01."

FIG. 7 is a schematic diagram showing a configuration example of the power saving status management table 275.

The power saving status management table 275 is provided with various columns; namely, a storage apparatus column 2751, a RAID group column 2752, a RAID level column 2753, a status (current) column 2754, a spin down column 2755, and a spin up column 2756. The power saving status management table 275 is configured to only display the status that is subsequent to the current status, and the statuses other than the subsequent status are stored in the memory 272, and sequentially displayed on the power saving status management table 275.

The storage apparatus column 2751 stores the number of the storage apparatus to be subject to the data I/O request.

The RAID group column 2752 stores the number of the RAID group 124 to be subject to the data I/O request. The number of the RAID group 124 is associated with the number of the storage apparatus.

The RAID level column 2753 stores the RAID configuration level of the RAID group 124.

The status (current) column 2754 stores the current operational status of the RAID group 124.

The spin down column 2755 includes a start date and time column and a status column. The start date and time column stores the scheduled start date and time of spinning down the RAID group 124, and the status column stores the type of spin down.

The spin up column 2756 stores the scheduled start date and time of spinning up the RAID group 124.

The example of FIG. 7 shows that the RAID level of the RAID group 124 number "001" of the storage apparatus number "storage 01" is "RAID 5," and is currently of a "spin up status." The example of FIG. 7 also shows that the RAID group 124 number "001" of the storage apparatus number "storage 01" is "scheduled to be partially spun down at 7:00 on Jun. 8, 2007."

Meanwhile, the example of FIG. 7 also shows that the RAID level of the RAID group 124 number "002" of the storage apparatus number "storage 01" is "RAID 6," and is currently of a "partial spin down status." The example of FIG. 7 also shows that the RAID group 124 number "002" of the storage apparatus number "storage 01" is "scheduled to be spun up at 7:00 on Jun. 8, 2007."

The power saving management processing according to the power saving management program 273 of the storage system 1 of this embodiment is now explained. Access history processing is foremost explained.

Figure 8:
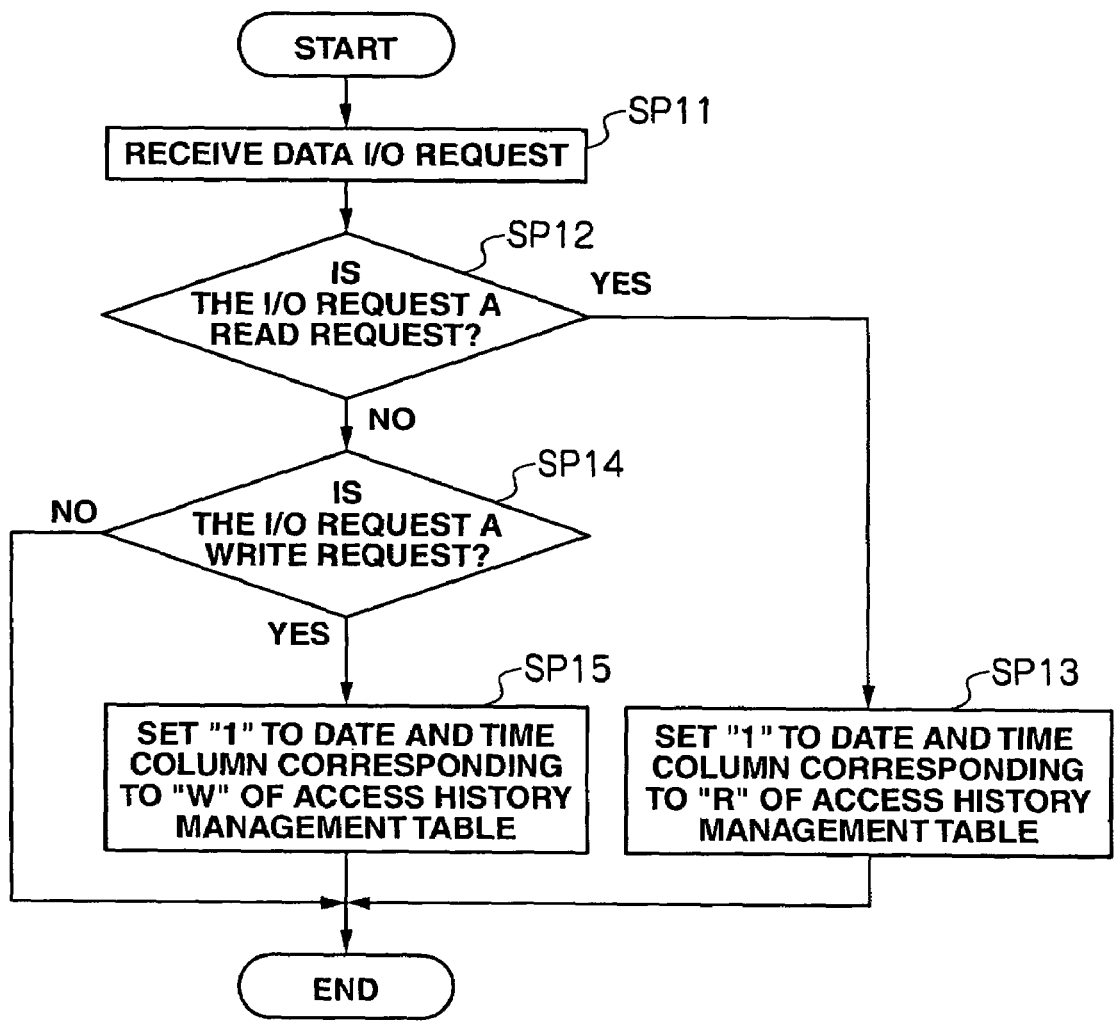
FIG. 8 is a flowchart showing the routine of access history processing.

FIG. 8 is a flowchart showing the access history processing routine to be performed by the access history management unit 2711 of the power saving control unit 27 in the higher level storage apparatus 4A.

When the channel adapter 22A receives a data I/O request from the server 2, the access history management unit 2711 starts the access history processing and receives the foregoing data I/O request (SP11).

Subsequently, the access history management unit 2711 determines whether the data I/O request is a read request (SP12).

If the access history management unit 2711 determines that the data I/O request is a read request (SP12: YES), it sets "1" in the corresponding date and time column 2744 of the I/O column 2743 of "R" in the access history management table 274 (SP13).

Meanwhile, if the access history management unit 2711 determines that the data I/O request is not a read request (SP12: NO), it determines whether the data I/O request is a write request (SP14).

If the access history management unit 2711 determines that the data I/O request is a write request (SP14: YES), it sets "1" in the corresponding date and time column 2744 of the I/O column 2743 of "W" in the access history management table 274 (SP15).

The access history management unit 2711 thereafter ends the access history processing.

Incidentally, "0" is set as the initial value in all items of the date and time column 2744 in the access history management table 274, and "1" is set only when there is a data I/O request.

This is because even if there is a single data I/O request during the spin down status, spin up must be performed, and the response time to the I/O request will deteriorate as a consequence.

The access history management table 274 accumulates three months' worth of access history. This three month period may be arbitrarily changed.

The power saving status management processing is now explained.

Figure 9:
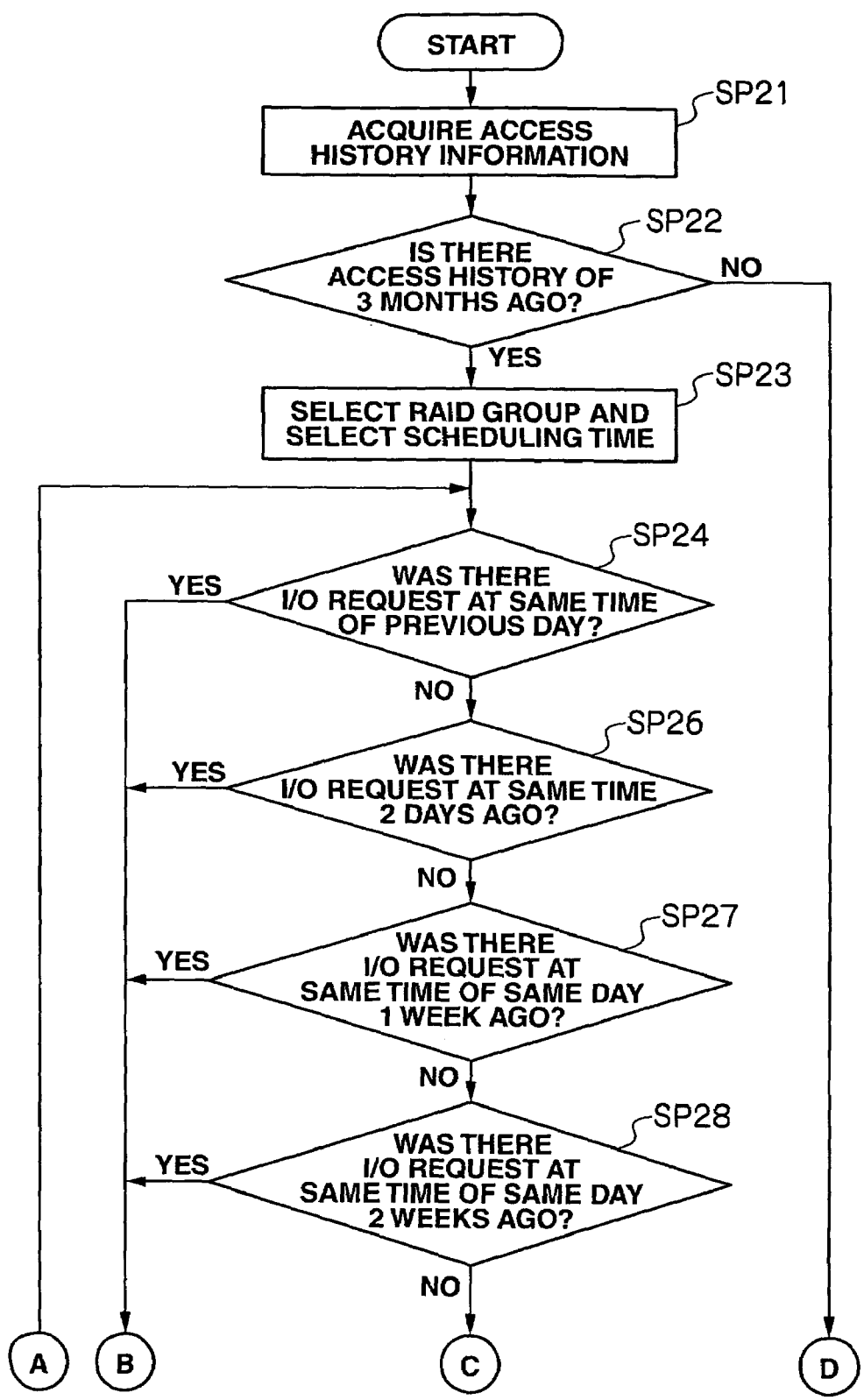
FIG. 9 is a flowchart showing the routine of power saving status management processing.
Figure 10:
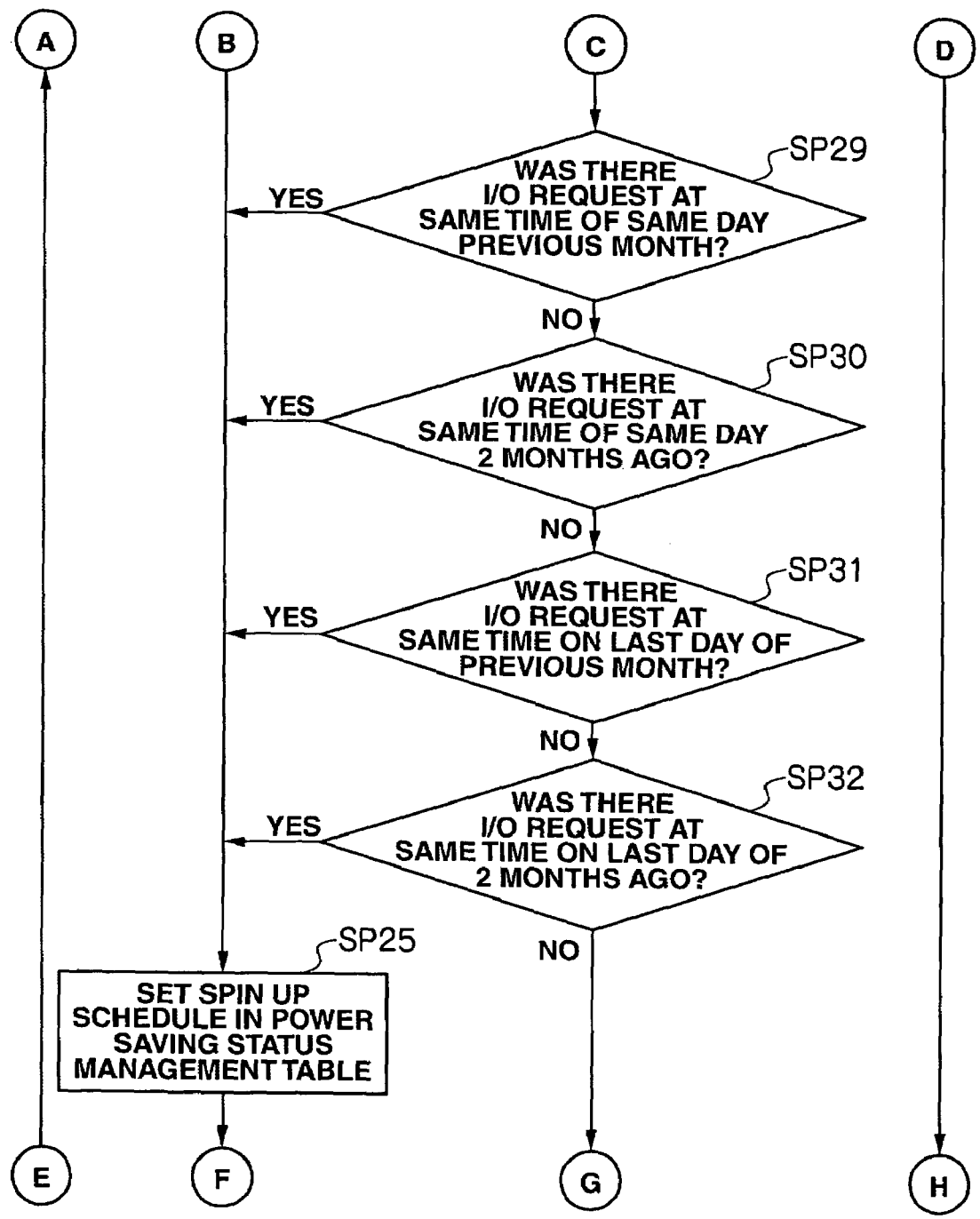
FIG. 10 is a flowchart showing the routine of power saving status management processing.
Figure 11:
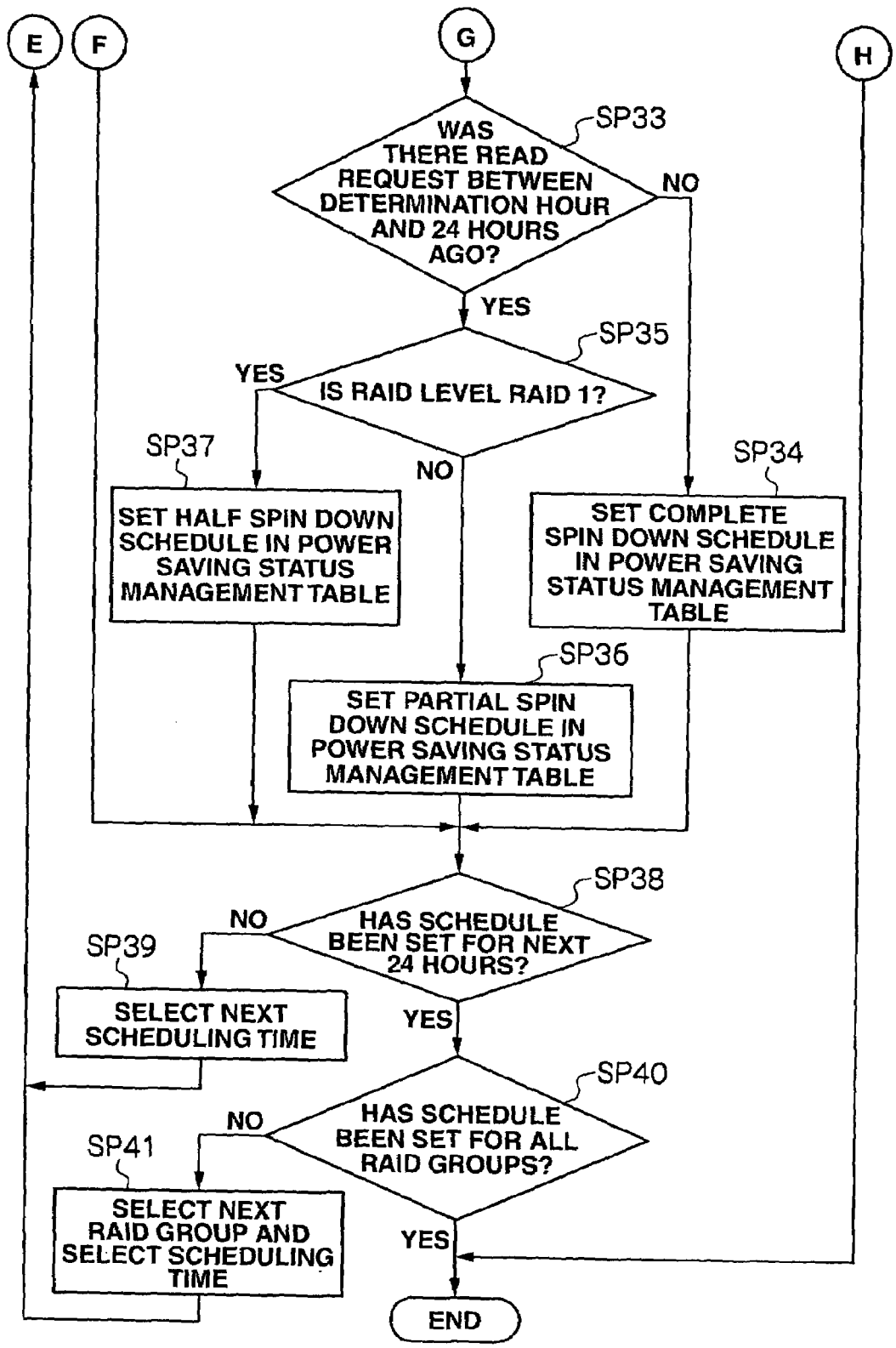
FIG. 11 is a flowchart showing the routine of power saving status management processing.

FIG. 9 to FIG. 11 are flowcharts showing the power saving status management processing routine to be performed by the status management unit 2712 of the power saving control unit 27 in the higher level storage apparatus 4A using the access history management table 274. With the power saving status management processing, the spin down/up schedule of the RAID group 124 is set for every hour from 1 hour later to 24 hours later. The spin down/up schedule of the RAID group 124 can also be set for every 10 minutes or every minute instead of every hour by managing the access history every 10 minutes or every minute.

The status management unit 2712, for instance, starts the power saving status management processing every hour (hereinafter referred to as the "determination hour"), and accesses access history information from the access history management table 274 through the access history management unit 2711 (SP21).

Subsequently, the status management unit 2712 determines whether three months have elapsed from the installation of the higher level storage apparatus 4A (SP22).

Specifically, the status management unit 2712 determines whether the access history management table 274 includes access history information that is three months or older.

If the status management unit 2712 determines that three months have not elapsed from the installation of the higher level storage apparatus 4A (SP22: NO), it subsequently ends the power saving status management processing.

Meanwhile, if the status management unit 2712 determines that three months have elapsed from the installation of the higher level storage apparatus 4A (SP22: YES), it selects a prescribed RAID group number from the power saving status management table 275, and selects a time (hereinafter referred to as the "scheduling time") for predicting and setting the spin down/up schedule (SP23). Foremost, 1 hour to 2 hours after the determination hour is selected as the scheduling time.

Subsequently, the status management unit 2712 determines whether there was a data I/O request to the RAID group 124 at the same time one day before the scheduling time (SP24).

If there was a data I/O request at the same time one day before the scheduling time (SP24: YES), the status management unit 2712 determines that there may be another I/O request at the same time as the scheduling time, sets the spin up schedule so that spin up is performed at the scheduling time by setting the date and time of the scheduling time in the spin up column 2756 of the corresponding RAID group column 2752 of the power saving status management table 275 (SP25), and then proceeds to step SP38 (described later).

Meanwhile, if there was no I/O request at the same time one day before the scheduling time (SP24: NO), the status management unit 2712 determines whether there was an I/O request at the same time two days before the scheduling time (SP26).

If there was an I/O request to the selected RAID group 124 at the same time two days before the scheduling time (SP26: YES), the status management unit 2712 performs the same processing as step SP25 of a case where there was an I/O request at the same time one day before the scheduling time, and then proceeds to step SP38 (described later).

Meanwhile, if there was no I/O request at the same time two days before the scheduling time (SP26: NO), the status management unit 2712 determines whether there was an I/O request at the same time on the same day one week before the scheduling time (SP27).

If there was an I/O request to the selected RAID group 124 at the same time on the same day one week before the scheduling time (SP27: YES), the status management unit 2712 performs the same processing as step SP25 of a case where there was an I/O request at the same time one day before the scheduling time, and then proceeds to step SP38 (described later).

Meanwhile, if there was no I/O request at the same time on the same day one week before the scheduling time (SP27: NO), the status management unit 2712 determines whether there was an I/O request at the same time on the same day two weeks before the scheduling time (SP28).

If there was an I/O request to the selected RAID group 124 at the same time on the same day two weeks before the scheduling time (SP28: YES), the status management unit 2712 performs the same processing as step SP25 of a case where there was an I/O request at the same time one day before the scheduling time, and then proceeds to step SP38 (described later).

Meanwhile, if there was no I/O request at the same time on the same day two weeks before the scheduling time (SP28: NO), the status management unit 2712 determines whether there was an I/O request at the same time on the same day one month before the scheduling time (SP29).

If there was an I/O request to the selected RAID group 124 at the same time on the same day one month before the scheduling time (SP29: YES), the status management unit 2712 performs the same processing as step SP25 of a case where there was an I/O request at the same time one day before the scheduling time, and then proceeds to step SP38 (described later).

Meanwhile, if there was no I/O request at the same time on the same day one month before the scheduling time (SP29: NO), the status management unit 2712 determines whether there was an I/O request at the same time on the same day two months before the scheduling time (SP30).

If there was an I/O request to the selected RAID group 124 at the same time on the same day two months before the scheduling time (SP30: YES), the status management unit 2712 performs the same processing as step SP25 of a case where there was an I/O request at the same time one day before the scheduling time, and then proceeds to step SP38 (described later).

Meanwhile, if there was no I/O request at the same time on the same day two months before the scheduling time (SP30: NO), the status management unit 2712 determines whether there was an I/O request at the same time on the last day of one month before the scheduling time (SP31). Although the month end is determined separately above since the access frequency tends to increase at the end of the month, whether there was an I/O request at the same time on a specific day other than the month end may also be determined.

If there was an I/O request to the selected RAID group 124 at the same time on the last day of one month before the scheduling time (SP31: YES), the status management unit 2712 performs the same processing as step SP25 of a case where there was an I/O request at the same time one day before the scheduling time, and then proceeds to step SP38 (described later).

Meanwhile, if there was no I/O request at the same time on the last day of one month before the scheduling time (SP31: NO), the status management unit 2712 determines whether there was an I/O request at the same time on the last day of two months before the scheduling time (SP32).

If there was an I/O request to the selected RAID group 124 at the same time on the last day of two months before the scheduling time (SP32: YES), the status management unit 2712 performs the same processing as step SP25 of a case where there was an I/O request at the same time one day before the scheduling time, and then proceeds to step SP38 (described later).

Meanwhile, if there was no I/O request at the same time on the last day of two months before the scheduling time (SP32: NO), the status management unit 2712 determines whether there was a data read request to the selected RAID group 124 between the determination hour and 24 hours ago (SP33).

If there was no data read request between the determination hour and 24 hours ago (SP33: NO), the status management unit 2712 determines that there is no possibility of an I/O request being issued once again at the same time as the scheduling time and sets the complete spin down schedule so that complete spin down is performed at the scheduling time by setting the date and time of the scheduling time as well as the complete spin down command in the spin down column 2755 of the corresponding RAID group column 2752 of the power saving status management table 275 (SP34), and then proceeds to step SP38 (described later).

Meanwhile, if there was a data read request between the determination hour and 24 hours ago (SP33: YES), the status management unit 2712 determines that there is a possibility that an I/O request will be issued once again at the same time as the scheduling time, refers to the power saving status management table 275, and determines whether the RAID level of the selected RAID group 124 is RAID 1 (SP35).

When the status management unit 2712 determines that the RAID level of the selected RAID group 124 is not RAID 1 (SP35: NO), it sets the partial spin down so that partial spin down is performed at the scheduling time by setting the date and time of the scheduling time as well as the partial spin down command in the spin down column 2755 of the corresponding RAID group column 2752 of the power saving status management table 275 (SP36), and then proceeds to step SP38 (described later).

Meanwhile, if the status management unit 2712 determines that the RAID level of the selected RAID group 124 is RAID 1 (SP35: YES), it sets the half spin down so that half spin down is performed at the scheduling time by setting the date and time of the scheduling time as well as the half spin down command in the spin down column 2755 of the corresponding RAID group column 2752 of the power saving status management table 275 (SP37), and then proceeds to step SP38 (described later).

The status management unit 2712 determines whether the spin down/up schedule of the selected RAID group 124 up to 24 hours later has been predicted and set (SP38).

If the spin down/up schedule of the selected RAID group 124 up to 24 hours later has not been predicted and set (SP38: NO), the status management unit 2712 selects the subsequent scheduling time which is one hour after the selected scheduling time (SP39), thereafter returns to step SP24, once again determines whether there was a data I/O request to the selected RAID group 124 at the same time one day before the scheduling time, and then repeats the same processing routine as the processing routine described above (SP24 to SP38).

Meanwhile, if the spin down/up schedule of the selected RAID group 124 up to 24 hours later has not been predicted and set (SP38: YES), the status management unit 2712 determines whether the spin down/up schedule of all RAID groups 124 has been predicted and set (SP40).

If the spin down/up schedule of all RAID groups 124 has not been predicted and set (SP40: NO), the status management unit 2712 selects the RAID group 124 subsequent to the selected RAID group 124, selects one hour after the determination hour as the scheduling time (SP41), thereafter returns to step SP24, once again determines whether there was a data I/O request to the selected RAID group 124 at the same time one day before the scheduling time, and then repeats the same processing routine as the processing routine described above (SP24 to SP38).

The status management unit 2712 thereafter ends the power saving status management processing.

The spin down/up execution processing is now explained.

Figure 12:
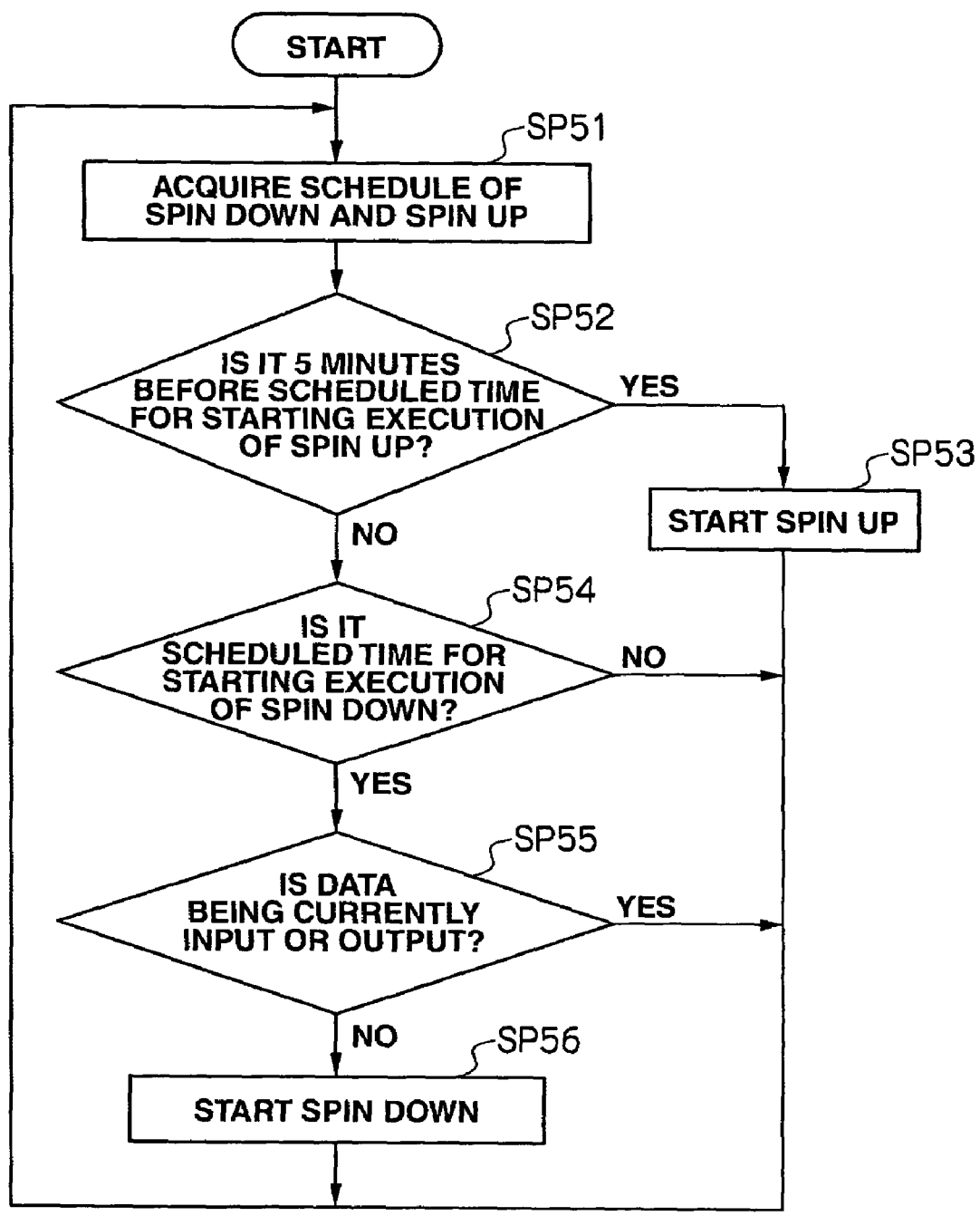
FIG. 12 is a flowchart showing the routine of spin down/up execution processing.

FIG. 12 is a flowchart showing the spin down/up execution processing routine to be performed by the status execution unit 2713 of the power saving control unit 27 in the higher level storage apparatus 4A.

The status execution unit 2713 starts the spin down/up execution processing when the power of the higher level storage apparatus 4A is turned on, or when the power saving function is started.

The status execution unit 2713, for example, acquires the power saving status management table 275 through the status management unit 2712 in prescribed intervals, and acquires the spin up and spin down schedules set in the spin down column 2755 and the spin up column 2756 (SP51).

Subsequently, the status execution unit 2713 determines whether the current time is 5 minutes before the scheduled time of starting the execution of spin up regarding any RAID group 124 (SP52).

If the current time is 5 minutes before the scheduled time of starting the execution of spin up (SP52: YES), the status execution unit 2713 sends a spin up signal of the HDD 12A, 12B of the corresponding RAID group 124 to the HDD power supply control circuit 32A or the power saving control unit 34, and starts the spin up of the HDD 12A, 12B so as to executes the spin up of the target RAID group 124 (SP53).

When the spin up of the HDD 12A, 12B is complete, the status execution unit 2713 sets "spin up" in the status (current) column 2754 of the corresponding RAID group column 2752 in the power saving status management table 275 through the status management unit 2712.

The status execution unit 2713 thereafter returns to step SP51, once again acquires the spin up and spin down schedules set in the spin down column 2755 and the spin up column 2756, and then repeats the same processing routine as the processing routine described above (SP51 to SP53).

Meanwhile, if the current time is not 5 minutes before the scheduled time of starting the execution of spin up (SP52: NO), the status execution unit 2713 determines whether the current time is the scheduled time for starting the execution of spin down regarding any RAID group 124 (SP54).

If the current time is not the scheduled time for starting the execution of spin down (SP54: NO), the status execution unit 2713 thereafter returns to step SP51, once again acquires the spin up and spin down schedules set in the spin down column 2755 and the spin up column 2756, and then repeats the same processing routine as the processing routine described above (SP51 to SP54).

Meanwhile, if the current time is the scheduled time for starting the execution of spin down (SP54: YES), the status execution unit 2713 determines whether data is currently being input to or output from the target RAID group 124 (SP55).

If data is currently being input to or output from the target RAID group 124 (SP55: YES), the status execution unit 2713 thereafter returns to step SP51, once again acquires the spin up and spin down schedules set in the spin down column 2755 and the spin up column 2756, and then repeats the same processing routine as the processing routine described above (SP51 to SP55).

Meanwhile, if data is not currently being input to or output from the target RAID group 124 (SP55: NO), the status execution unit 2713 sends a spin down signal (complete spin down signal, partial spin down signal or half spin down signal) of the HDD 12A, 12B of the corresponding RAID group 124 to the HDD power supply control circuit 32A or the power saving control unit 34, and starts the spin down (complete spin down, partial spin down or half spin down) of the foregoing HDD 12A, 12B so as to execute the spin down of the target RAID group 124 (SP56).

When the spin down of the foregoing HDD 12A, 12B is complete, the status execution unit 2713 sets "complete spin down," "partial spin down" or "half spin down" in the status (current) column 2754 of the corresponding RAID group column 2752 in the power saving status management table 275 through the status management unit 2712.

The status execution unit 2713 thereafter returns to step SP51, once again acquires the spin up and spin down schedules set in the spin down column 2755 and the spin up column 2756, and then repeats the same processing routine as the processing routine described above (SP51 to SP53).

As described above, as a result of the status execution unit 2713 performing the foregoing processing in the higher level storage apparatus 4A, spin up will be performed 5 minutes before the scheduled time of executing the processing. This is because consideration is given to the time until the status enters a spin up status after the spin up signal is sent. Spin up does not have to be started 5 minutes before the scheduled time of executing processing, and may be started at a prescribed time before entering the spin up status.

The reply processing in a case where a data I/O request is made to the RAID group 124 in a complete spin down status is now explained.

Figure 13:
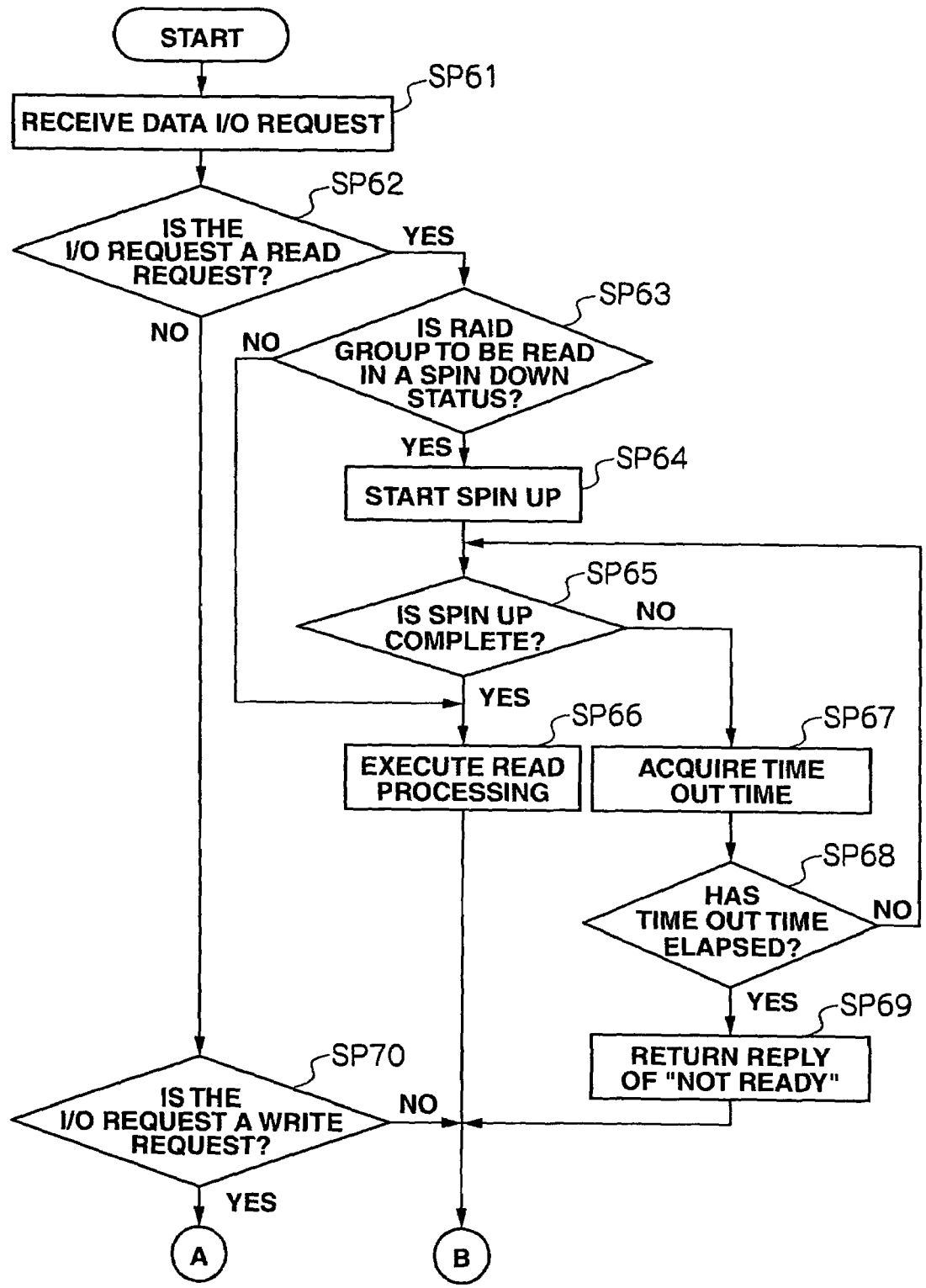
FIG. 13 is a flowchart showing the routine of reply processing in a complete spin down status.
Figure 14:
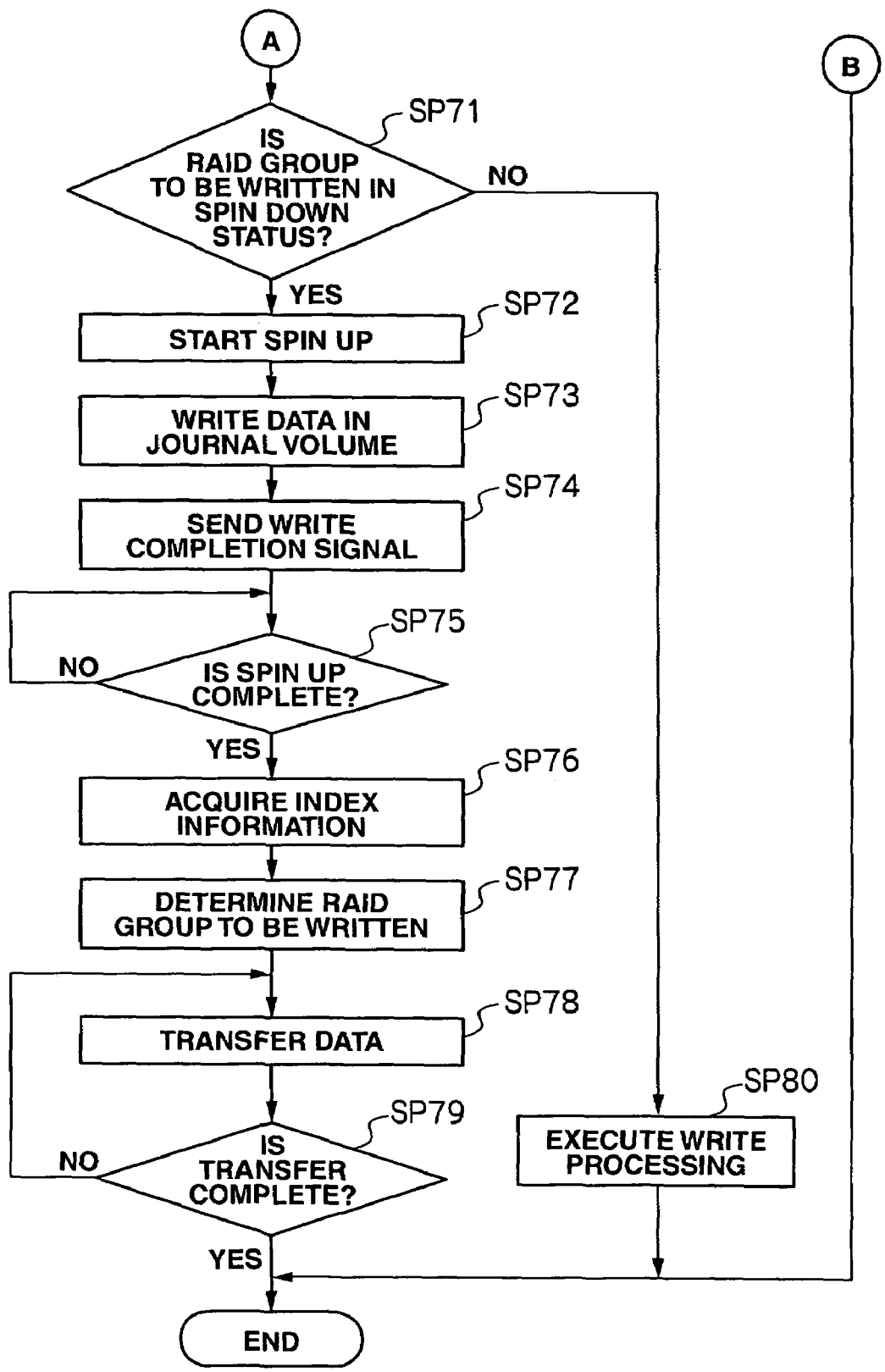
FIG. 14 is a flowchart showing the routine of reply processing in a complete spin down status.

FIG. 13 and FIG. 14 are flowcharts showing the reply processing routine in a complete spin down status to be performed by the status execution unit 2713, the journal response unit 2714 and the delayed response unit 2715 of the power saving control unit 27 in the higher level storage apparatus 4A.

When the channel adapter 22A receives a data I/O request from the server 2, the status execution unit 2713 starts the reply processing in the complete spin down status, and receives the foregoing data I/O request through the access history management unit 2711 (SP61).

Subsequently, the status execution unit 2713 determines whether the data I/O request is a read request (SP62).

If the status execution unit 2713 determines that the I/O request is a read request (SP62: YES), it reads the status in the status (current) column 2754 of the corresponding RAID group column 2752 through the status management unit 2712, and determines whether the RAID group 124 subject to the read request is in a spin down status (SP63).

If the status execution unit 2713 determines that the RAID group 124 subject to the read request is not in a spin down status (SP63: NO), it proceeds to step SP66.

Meanwhile, if the status execution unit 2713 determines that the RAID group 124 subject to the read request is in a spin down status (SP63: YES), it sends a spin up signal of the HDD 12A, 12B of the RAID group 124 subject to the read request to the HDD power supply control circuit 32A or the power saving control unit 34, and starts the spin up of the HDD 12A, 12B (SP64).

Simultaneously with sending the spin up signal, the status execution unit 2713 determines whether the spin up of the RAID group 124 subject to the read request is complete through the delayed response unit 2715 (SP65).

If the status execution unit 2713 determines that the spin up of the RAID group 124 subject to the read request is complete (SP65: YES), it sends a read signal to the corresponding disk adapter 26A of the RAID group 124 subject to the read request so as to read the read request data from the target RAID group 124 (SP66). The status execution unit 2713 thereafter ends the reply processing in the complete spin down status.

Meanwhile, if the status execution unit 2713 determines that the spin up of the RAID group 124 subject to the read request is incomplete (SP65: NO), it acquires the time out time preliminarily set for each RAID group 124 in the delayed response unit 2715 through the delayed response unit 2715 (SP67).

Subsequently, the status execution unit 2713 receives a read request through the delayed response unit 2715, and thereafter determines whether the preliminarily set time out time has elapsed (SP68).

If the status execution unit 2713 determines that the preliminarily set time out time has elapsed (SP68: YES), it issues a command to the channel adapter 22A, through the delayed response unit 2715, to return a Not Ready reply to the server 2 showing that the RAID group 124 subject to the read request is in a status where data cannot be read from such RAID group 124 (SP69). The status execution unit 2713 thereafter ends the reply processing in the complete spin down status.

If the status execution unit 2713 determines that the preliminarily set time out time has not elapsed (SP68: NO), it once again determines whether the spin up of the RAID group 124 subject to the read request is complete through the delayed response unit 2715 (SP65).

Like this, the higher level storage apparatus 4A is configured so that it will not instantaneously return a Not Ready reply upon receiving a read request during the migration from a spin down status to a spin up status. If the Not Ready reply is returned instantaneously, the server 2 may misidentify that the RAID group 124 subject to the read request is shut off due to failure or the like after several retries.

Thus, with the higher level storage apparatus 4A, by delaying the Not Ready reply for a given period of time, it is possible to prevent the server 2 from misidentifying that the RAID group 124 subject to the read request is shut off due to failure or the like Meanwhile, if the status execution unit 2713 determines that the I/O request is not a read request (SP62: NO), it determines whether the I/O request is a write request (SP70).

If the status execution unit 2713 determines that the I/O request is not a write request (SP70: NO), it thereafter ends the reply processing in the complete spin down status.

Meanwhile, if the status execution unit 2713 determines that the I/O request is a write request (SP70: YES), it determines whether the RAID group 124 subject to the write request is in a spin down status (SP71).

If the status execution unit 2713 determines that the RAID group 124 subject to the write request is in a spin down status (SP71: YES), it sends a spin up signal of the HDD 12A, 12B of the RAID group 124 subject to the write request to the HDD power supply control circuit 32A or the power saving control unit 34, and starts the spin up of the HDD 12A, 12B (SP72).

Subsequently, the status execution unit 2713 sends a spin up signal, and simultaneously stores the data being received from the server 2, together with index information, in the journal volume 122 through the journal response unit 2714 (SP73).

When the status execution unit 2713 completes the writing of data into the journal volume 122, it sends a signal indicating the completion of writing to the channel adapter 22A through the journal response unit 2714 (SP74).

Subsequently, the status execution unit 2713 acquires the current status from the status (current) column 2754 of the power saving status management table 275 through the status management unit 2712, and determines whether the spin up of the RAID group 124 subject to the write request is complete (SP75).

If the status execution unit 2713 determines that the spin up is incomplete (SP75: NO), it waits for the spin up of the RAID group 124 subject to the write request to be completed. If the status execution unit 2713 determines that the spin up is complete (SP75: YES), it acquires index information of the write-target data from the journal volume 122 (SP76), and determines which RAID group 124 is subject to the write request (SP77).

The status execution unit 2713 thereafter transfers data from the journal volume 122 to the RAID group 124 subject to the write request (SP78). When the status execution unit 2713 determines that the foregoing data transfer is complete (SP79: YES), it thereafter ends the reply processing in the complete spin down status.

If the status execution unit 2713 determines that the RAID group 124 subject to the write request is not in a spin down status (SP71: NO), it performs processing for writing data into the RAID group 124 subject to the write request through the disk adapter 26A, 26B (SP80).

Like this, with the higher level storage apparatus 4A, it is possible to prevent the deterioration in the response time to the server 2 even when there is a write request during a complete spin down status by performing the foregoing processing.

The screen display processing in the power saving management apparatus 5 is now explained.

Figure 15:
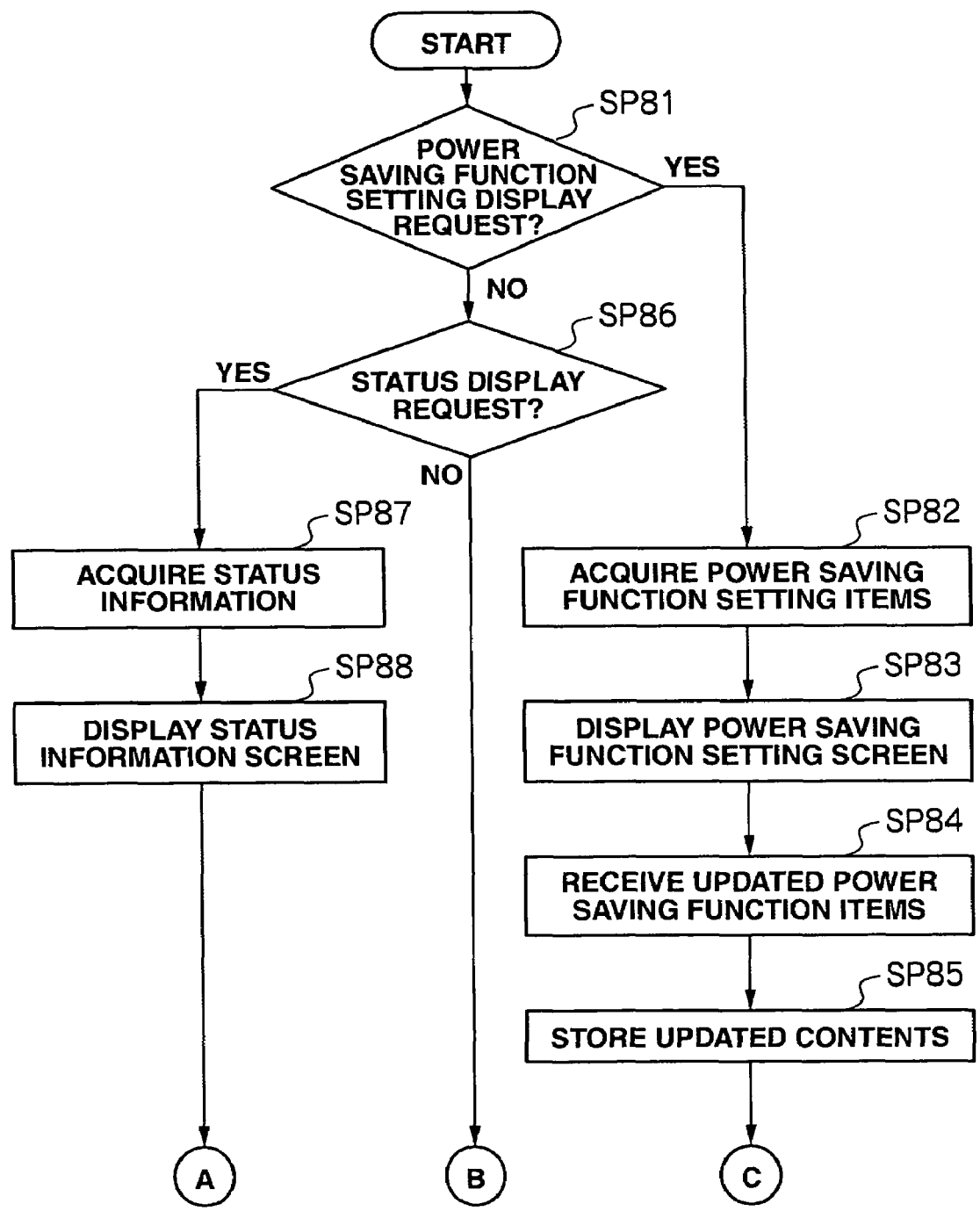
FIG. 15 is a flowchart showing the routine of screen display processing.
Figure 16:
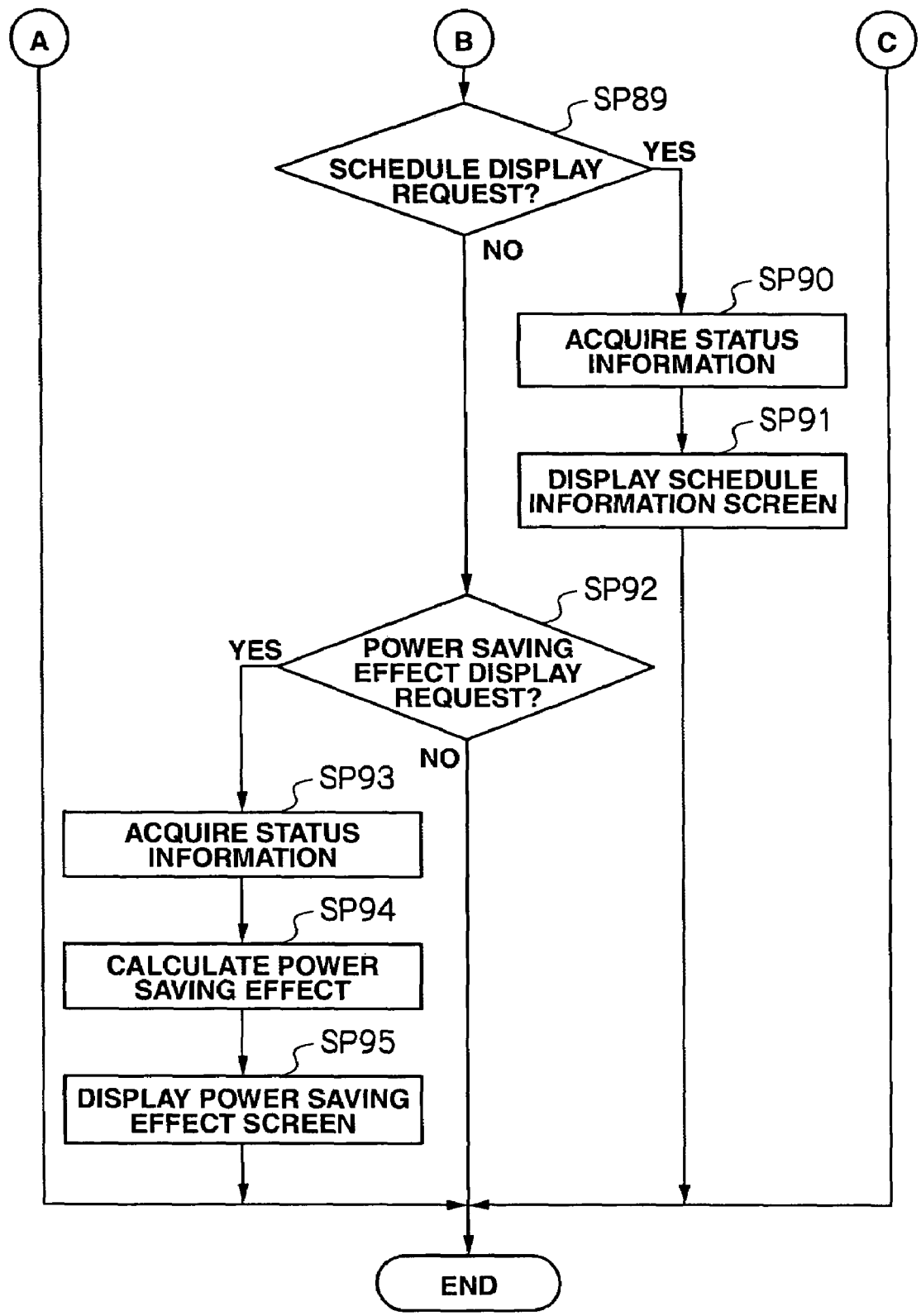
FIG. 16 is a flowchart showing the routine of screen display processing.

FIG. 15 and FIG. 16 are flowcharts showing the screen display processing routine in the power saving management apparatus 5 to be performed by the status management unit 2712 of the power saving control unit 27 in the higher level storage apparatus 4A.

When the status management unit 2712 receives a screen display request from the power saving management apparatus 5, it determines whether the foregoing request is a power saving function setting display request (SP81).

If the status management unit 2712 determines that the request is a power saving function setting display request (SP81: YES), it acquires the power saving function setting items preliminary set to each storage apparatus (SP82), and commands the power saving management apparatus 5 to display the power saving function setting screen 131 (SP83). The power saving management apparatus 5 displays the power saving function setting screen 131 based on the foregoing command.

The power saving function setting screen 131 is now explained with reference to the relevant drawing.

FIG. 17 is a diagram showing a screen display example of the power saving function setting screen 131.

The power saving function setting screen 131 is provided with various columns; namely, a storage apparatus column 1311, a contents column 1312, and a setting column 1313.

The storage apparatus column 1311 displays the number of the storage apparatus to be subject to the power saving setting. The contents column 1312 displays the settable contents among the power saving functions in the respective storage apparatuses. The setting column 1313 is used for selecting whether to use the respective power saving functions.

In the example of FIG. 17, the storage apparatus having a storage apparatus number of "storage 01" is set so as to be subject to a spin down.

The setting is such that a complete spin down is performed for this spin down, and a partial spin down and a half spin down are not performed.

Returning to the flowcharts of the screen display processing illustrated in FIG. 15 and FIG. 16, the remaining routine is now explained.

When the status management unit 2712 receives the updated power saving function setting items upon the power saving management apparatus 5 selecting whether to use the power saving function (SP84), it stores the updated contents as the power saving function setting items, and uses such contents in the power saving control (SP85).

Meanwhile, if the status management unit 2712 determines that the screen display request is not a power saving function setting (SP81: NO), it determines whether the request is the status display request of the current spin up and spin down (SP86).

If the status management unit 2712 determines that the request is a status display request (SP86: YES), it acquires status information from the power saving status management table 275 (SP87), and commands the power saving management apparatus 5 to display the status information screen 132 (SP88). The power saving management apparatus 5 displays the status information screen 132 based on the foregoing command.

The status information screen 132 is now explained with reference to the relevant drawing.

FIG. 18 is a diagram showing a screen display example of the status information screen 132.

The status information screen 132 displays various columns; namely, a storage apparatus column 1321, a RAID group column 1322, a RAID level 1323, and a status (current) column 1324.

The storage apparatus column 1321 displays the number of the storage apparatus to be subject to the power saving setting. The RAID group column 1322 displays the number of the RAID group 124 provided to the respective storage apparatuses. The RAID level column 1323 displays the RAID level of the number of the RAID group 124 provided to the respective storage apparatuses. The status (current) column 1324 displays the current status of the respective RAID groups 124.

The example of FIG. 18 shows that the RAID level of the RAID group 124 having a RAID group 124 number of "001" is "RAID 5" and the status is a "spin up" status in the storage apparatus having a storage apparatus number of "storage 01."

The example of FIG. 18 also shows that the RAID level of the RAID group 124 having a RAID group 124 number of "002" is "RAID 6" and the status is a "partial spin down" status in the storage apparatus having a storage apparatus number of "storage 01."

These settings are realized by acquiring the status information stored in the power saving status management table 275 and referring to the respective items.

Returning to the flowcharts of the screen display processing illustrated in FIG. 15 and FIG. 16, the remaining routine is now explained.

Meanwhile, if the status management unit 2712 determines that the screen display request is not a status display request (SP86: NO), it determines whether the request is a spin up and spin down schedule display request (SP89).

If the status management unit 2712 determines that the request is a schedule display request (SP89: YES), it acquires status information from the power saving status management table 275 (SP90), and commands the power saving management apparatus 5 to display the schedule information screen 133 (SP91). The power saving management apparatus 5 displays the schedule information screen 133 based on the foregoing command.

The schedule information screen 133 is now explained with reference to the relevant drawing.

FIG. 19 is a diagram showing a screen display example of the schedule information screen 133.

The schedule information screen 133 displays various columns; namely, a storage apparatus column 1331, a RAID group column 1332, a RAID level column 1333, a spin down column 1334, and a spin up column 1335.

The storage apparatus column 1331 displays the number of the storage apparatus to be subject to the power saving setting. The RAID group column 1332 displays the number of the RAID group 124 provided to the respective storage apparatuses. The RAID level column 1333 displays the RAID level of the number of the RAID group 124 provided to the respective storage apparatuses. The spin down column 1334 associates and displays a start date and time column and a status column. The start date and time column displays the start date and time of the spin down. The status column displays the type of spin down; that is, whether the spin down is a complete spin down, a partial spin down, or a half spin down. The spin up column 1334 displays the start date and time of the spin up.

The example of FIG. 19 shows that the RAID level of the RAID group 124 having a RAID group 124 number of "001" is "RAID 5" and a "partial spin down is scheduled at 7:00 on Jun. 7, 2007" in the storage apparatus having a storage apparatus number of "storage 01."

The example of FIG. 19 also shows that the RAID level of the RAID group 124 having a RAID group 124 number of "002" is "RAID 6" and a "spin up is scheduled at 7:00 on Jun. 7, 2007" in the storage apparatus having a storage apparatus number of "storage 01."

These settings are realized by acquiring the status information stored in the power saving status management table 275, and referring to the respective items. With the power saving management apparatus 5, for instance, if it is undesirable to perform a spin up on the scheduled date and time for executing the spin up, the spin down/up schedule can be manually changed in part by the operator's operation.

Returning to the flowcharts of the screen display processing illustrated in FIG. 15 and FIG. 16, the remaining routine is now explained.

Meanwhile, if the status management unit 2712 determines that the screen display request is not a schedule display request (SP89: NO), it determines whether the request is a power saving effect display request showing the power saving effect according to the power saving function (SP92).

If the status management unit 2712 determines that the request is a power saving effect display request (SP92: YES), it acquires status information from the power saving status management table 275 (SP93), and calculates the power saving effect (SP94).

Specifically, the status management unit 2712 calculates the power saving effect by dividing the accumulated time of the HDD spun down according to the power saving function by the total cumulative drive time of the HDD in the storage apparatus based on the status information. The status management unit 2712 thereafter commands the power saving management apparatus 5 to display the calculated power saving effect as the power saving effect screen 134 (SP95). The power saving management apparatus 5 displays the power saving effect screen 134 based on the foregoing command.

The power saving effect screen 134 is now explained with reference to the relevant drawing.

Figure 20:
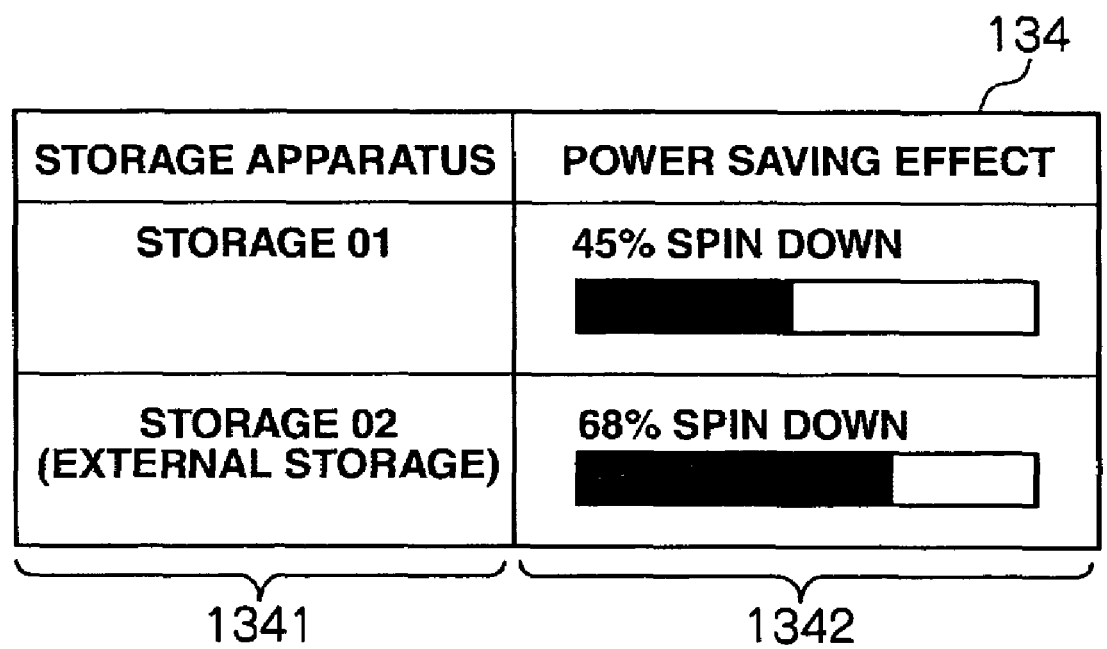
FIG. 20 is a diagram showing a screen display example of a power saving effect screen.

FIG. 20 is a diagram showing a screen display example of the power saving effect screen 134.

The power saving effect screen 134 displays the respective columns; namely, the storage apparatus column 1341 and the power saving effect column 1342.

The storage apparatus column 1341 displays the number of the storage apparatus to be subject to the power saving setting. The power saving effect column 1342 displays the calculated power saving effect.

The example of FIG. 20 shows that the power saving effect calculated regarding the storage apparatus having a storage apparatus number of "storage 01" is "45%.")

As a result of using the foregoing higher level storage apparatus 4A, it is possible to prevent the deterioration in the response time when there is access by predicting the subsequent access based on the access history management table 274 and pre-starting the HDD 12A, 12B of the corresponding RAID group 124 when it is predicted that access will be made, and realize a power saving effect by stopping the HDD 12A, 12B of the corresponding RAID group 124 when it is predicted that access will not be made.

What is claimed is:

1. A storage apparatus connected to a host system for sending and receiving data to and from said host system, comprising:
 a first data storage unit of a plurality of data storage units for storing write data requested by said host system;
 an access history storage unit for storing, when there is a write request for writing data into said first data storage unit or a read request for reading data stored in said first data storage unit, history of said write request or read request as access history;

an operational information storage unit for storing operational information showing whether said first data storage unit is operating;

an access prediction unit for predicting whether said first data storage unit will be accessed based on said access history;

a send processing unit for delaying an error message for a given length of time when said first data storage unit is shut off and there is a read request for reading data stored in said first data storage unit; and an operational control unit for performing operational control of pre-starting said first data storage unit when said first data storage unit is shut off and said access prediction unit predicts that said first data storage unit will be accessed, or stopping said first data storage unit when said first data storage unit is operating and said access prediction unit predicts that said first data storage unit will not be accessed.

2. The storage apparatus according to claim 1, wherein said operational control unit stops only the operation of certain data storage units or resumes only the operation of certain data storage units among the plurality of said data storage units.

3. The storage apparatus according to claim 2, wherein said operational control unit stops the operation of a mirror-side data storage unit or resumes the operation of said stopped mirror-side data storage unit when said plurality of data storage units are configured in a RAID 1 configuration.

4. The storage apparatus according to claim 2, wherein said operational control unit stops the operation of an arbitrary data storage unit among the data storage units configured in RAID 5 or RAID 6 or resumes the operation of said stopped data storage unit when said plurality of data storage units are configured in a RAID 5 or RAID 6 configuration.

5. The storage apparatus according to claim 1, further comprising:

a temporary storage unit for temporarily storing write request data when said first data storage unit is shut off and there is a write request for writing data into said first data storage unit; and a data transfer unit for confirming that said first data storage unit subject to said write request has been started, and transferring data stored in said temporary storage unit to said first data storage unit subject to said write request.

6. A power saving method of a storage apparatus connected to a host system for sending and receiving data to and from said host system, comprising:

a first step of a first data storage unit of a plurality of data storage units storing write data requested by said host system;

a second step of an access history storage unit storing, when there is a write request for writing data into said first data storage unit or a read request for reading data stored in said first data storage unit, history of said write request or read request as access history;

a third step of an operational information storage unit storing operational information showing whether said first data storage unit is operating;

a fourth step of an access prediction unit predicting whether said first data storage unit will be accessed based on said access history;

a fifth step of an operational control unit performing operational control of pre-starting said first data storage unit when said first data storage unit is shut off and said access prediction unit predicts that said first data storage unit will be accessed, or stopping said first data storage unit when said first data storage unit is operating and said access prediction unit predicts that said first data storage unit will not be accessed; and a sixth step of delaying an error message for a given length of time when said first data storage unit is shut off and there is a read request for reading data stored in said first data storage unit.

7. The power saving method according to claim 6, wherein, at said fifth step, only the operation of certain data storage units is stopped or only the operation of certain data storage units is resumed among the plurality of said data storage units.

8. The power saving method according to claim 7, wherein, at said fifth step, the operation of a mirror-side data storage unit is stopped or the operation of said stopped mirror-side data storage unit is resumed when said plurality of data storage units are configured in a RAID 1 configuration.

9. The power saving method according to claim 7, wherein, at said fifth step, the operation of an arbitrary data storage unit among the data storage units configured in RAID 5 or RAID 6 is stopped or the operation of said stopped data storage unit is resumed when said plurality of data storage units are configured in a RAID 5 or RAID 6 configuration.

10. The power saving method according to claim 6, further comprising: a step of a temporary storage unit temporarily storing said write request data when said first data storage unit is shut off and there is a write request for writing data into said first data storage unit; and a step of a data transfer unit confirming that said first data storage unit subject to said write request has been started, and transferring data stored in said temporary storage unit to said first data storage unit subject to said write request.

* * * * *